(12) United States Patent
Takeda et al.

(10) Patent No.: US 11,071,132 B2
(45) Date of Patent: Jul. 20, 2021

(54) TERMINAL AND RADIO COMMUNICATION METHOD FOR REDUCING INTERFERENCE AGAINST PREDETERMINED SIGNALS

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 375 days.

(21) Appl. No.: 16/097,674

(22) PCT Filed: May 1, 2017

(86) PCT No.: PCT/JP2017/017185
§ 371 (c)(1),
(2) Date: Oct. 30, 2018

(87) PCT Pub. No.: WO2017/191831
PCT Pub. Date: Nov. 9, 2017

(65) Prior Publication Data
US 2020/0367269 A1    Nov. 19, 2020

(30) Foreign Application Priority Data

May 2, 2016 (JP) .............................. JP2016-092682

(51) Int. Cl.
*H04W 72/12* (2009.01)

(52) U.S. Cl.
CPC ... *H04W 72/1273* (2013.01); *H04W 72/1268* (2013.01); *H04W 72/1289* (2013.01)

(58) Field of Classification Search
CPC ......... H04W 72/1268; H04W 72/1273; H04W 72/1289; H04W 48/12; H04W 72/0446; H04W 72/04; H04W 72/044; H04W 52/04; H04W 72/12; H04W 72/1284
See application file for complete search history.

(56) References Cited

U.S. PATENT DOCUMENTS

2015/0131579 A1*  5/2015  Li ..................... H04L 1/1858
                                                        370/329
2016/0150490 A1*  5/2016  Ouchi ................. H04W 52/16
                                                        455/522
2017/0170940 A1*  6/2017  Lee ..................... H04L 5/1469
(Continued)

OTHER PUBLICATIONS

International Search Report issued in PCT/JP2017/017185 dated Jul. 25, 2017 (2 pages).
(Continued)

*Primary Examiner* — Mewale A Ambaye
(74) *Attorney, Agent, or Firm* — Osha Bergman Watanabe & Burton LLP

(57) ABSTRACT

A terminal is disclosed including a receiver that monitors a downlink control channel which is allocated in units of subframes and receives downlink control information; and a processor that controls at least one of data transmission and reception, in units of transmission time intervals (TTIs), based on the downlink control information. Additionally, the processor controls at least one of transmission and reception, assuming that at least one of the subframe duration and the TTI duration is variable; and skips at least of monitoring the downlink control channel and transmitting an uplink control channel, during at least one of the data transmission and reception.

12 Claims, 20 Drawing Sheets

(56) References Cited

U.S. PATENT DOCUMENTS

| | | | |
|---|---|---|---|
| 2017/0195028 A1* | 7/2017 | Shimezawa | H04L 1/0026 |
| 2017/0238287 A1* | 8/2017 | Kusashima | H04L 1/1854 |
| | | | 370/280 |
| 2018/0255572 A1* | 9/2018 | Harada | H04L 5/0048 |
| 2019/0098626 A1* | 3/2019 | Yi | H04W 72/0473 |

OTHER PUBLICATIONS

Written Opinion of the International Searching Authority issued in PCT/JP2017/017185 dated Jul. 25, 2017 (4 pages).

LG Electronics; "Support different TTI length for data channels and PUCCH"; 3GPP TSG RAN WG1 Meeting #84bis, R1-163101; Busan, Korea; Apr. 11-15, 2016 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

\* cited by examiner

| UPLINK-DOWNLINK CONFIGURATION | DOWNLINK-TO-UPLINK SWITCH-POINT PERIODICITY | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 1 (Prior art)

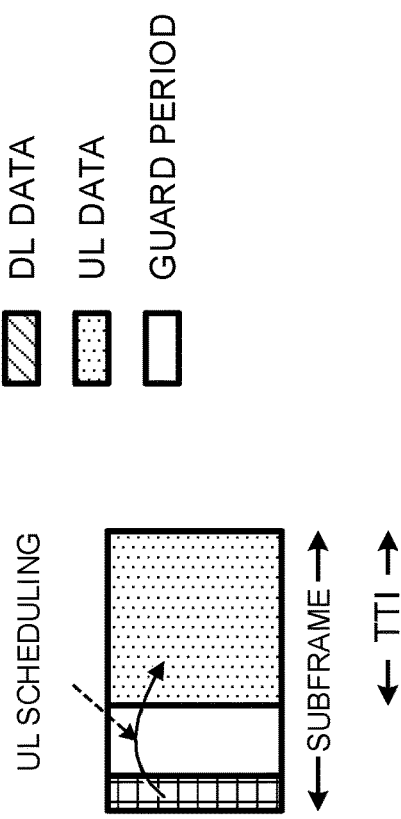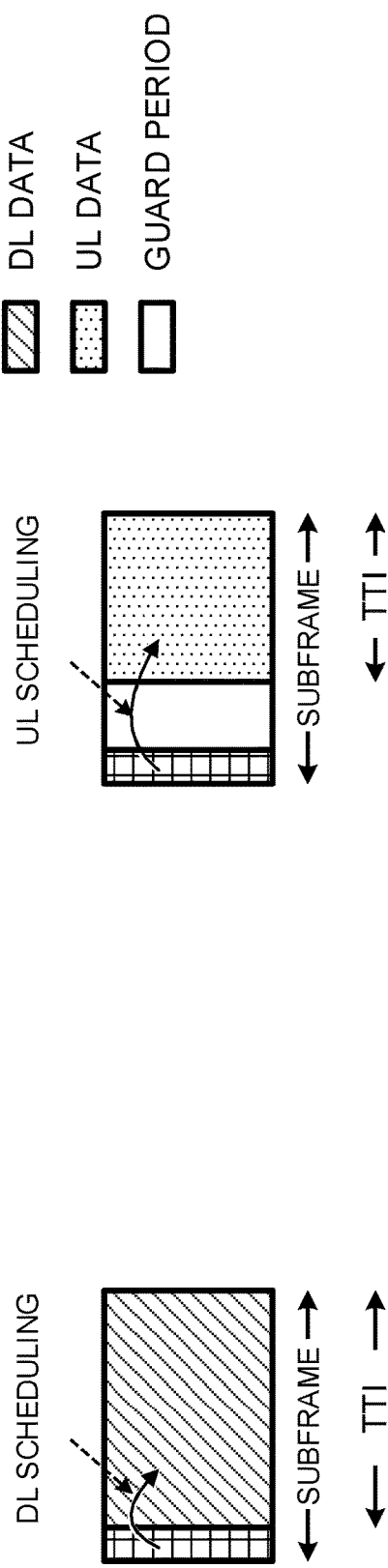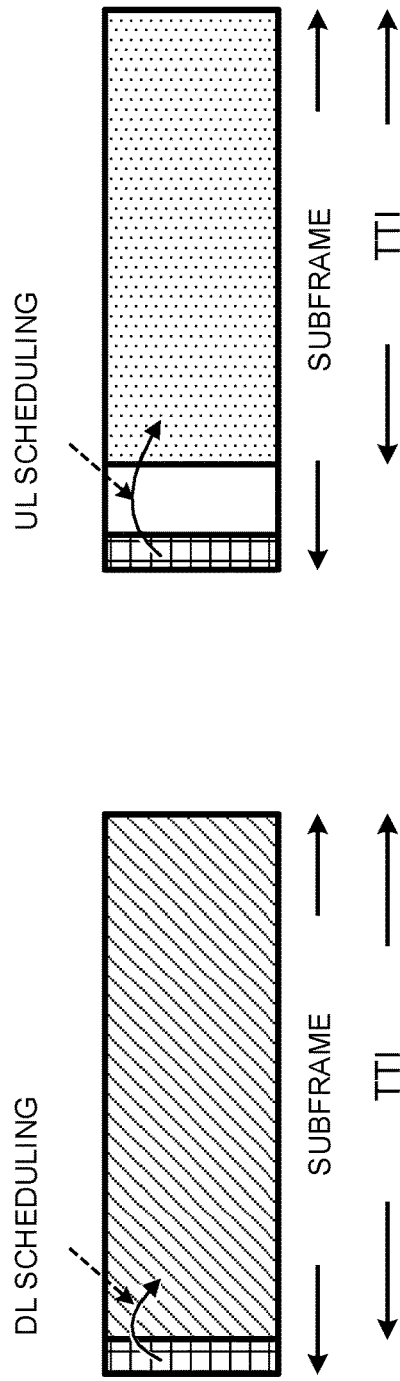
FIG. 3A  FIG. 3B  FIG. 3C  FIG. 3D

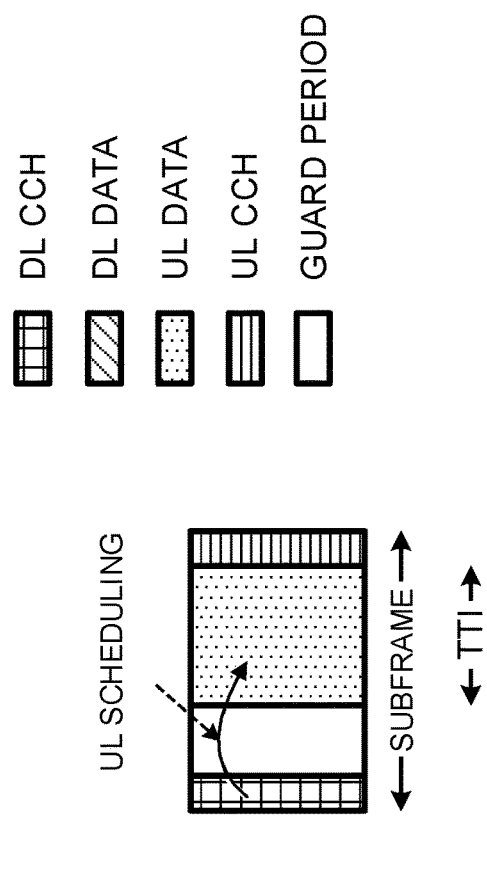
FIG. 5C
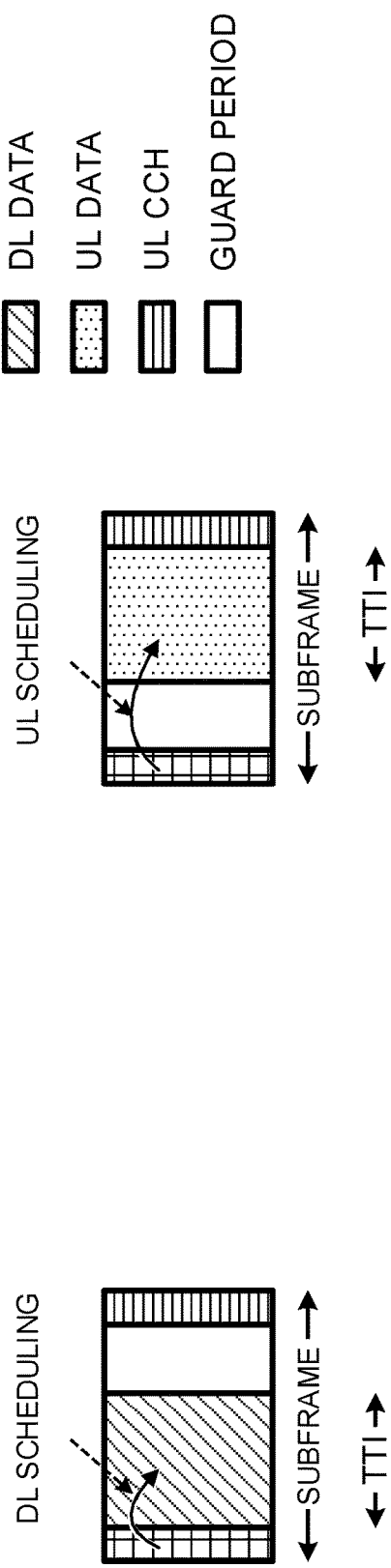
FIG. 5D
FIG. 5A
FIG. 5B

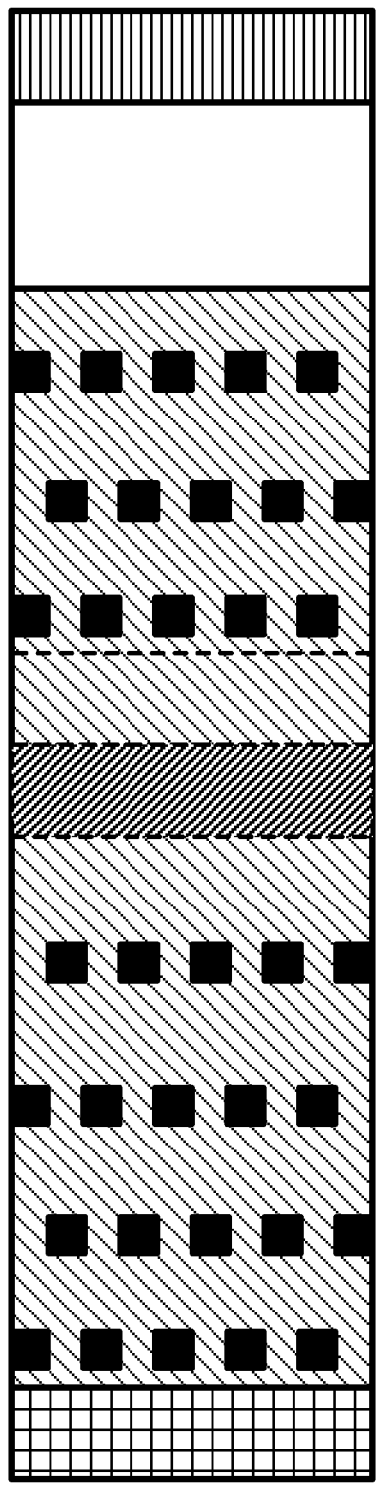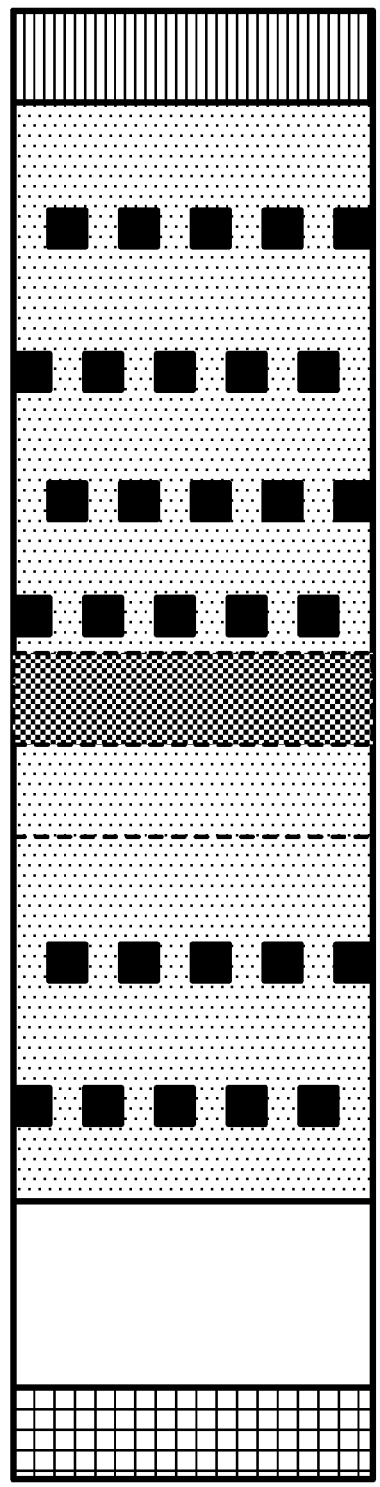
FIG. 8A
FIG. 8B

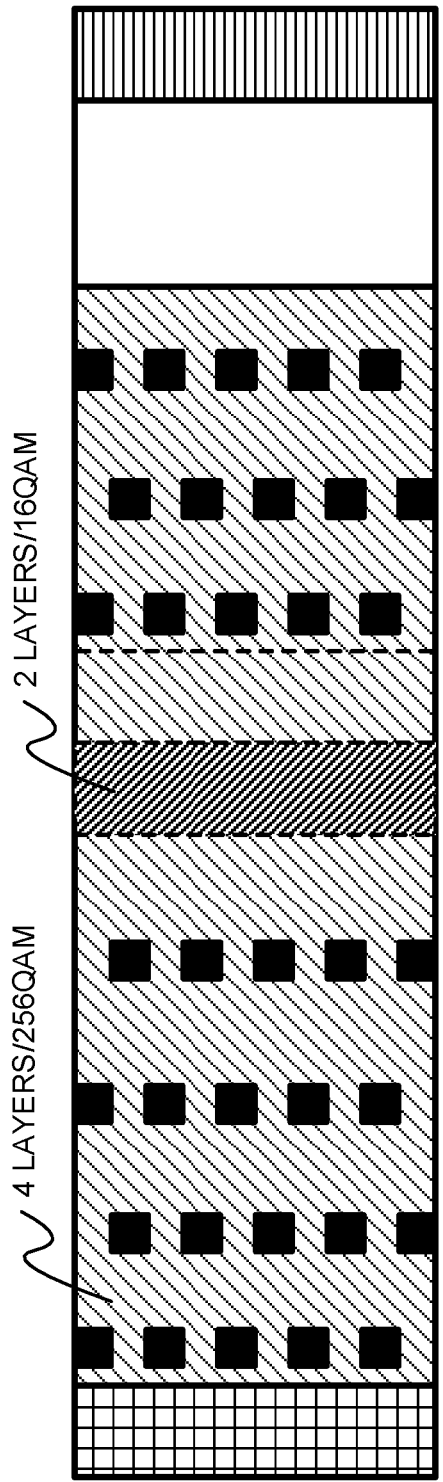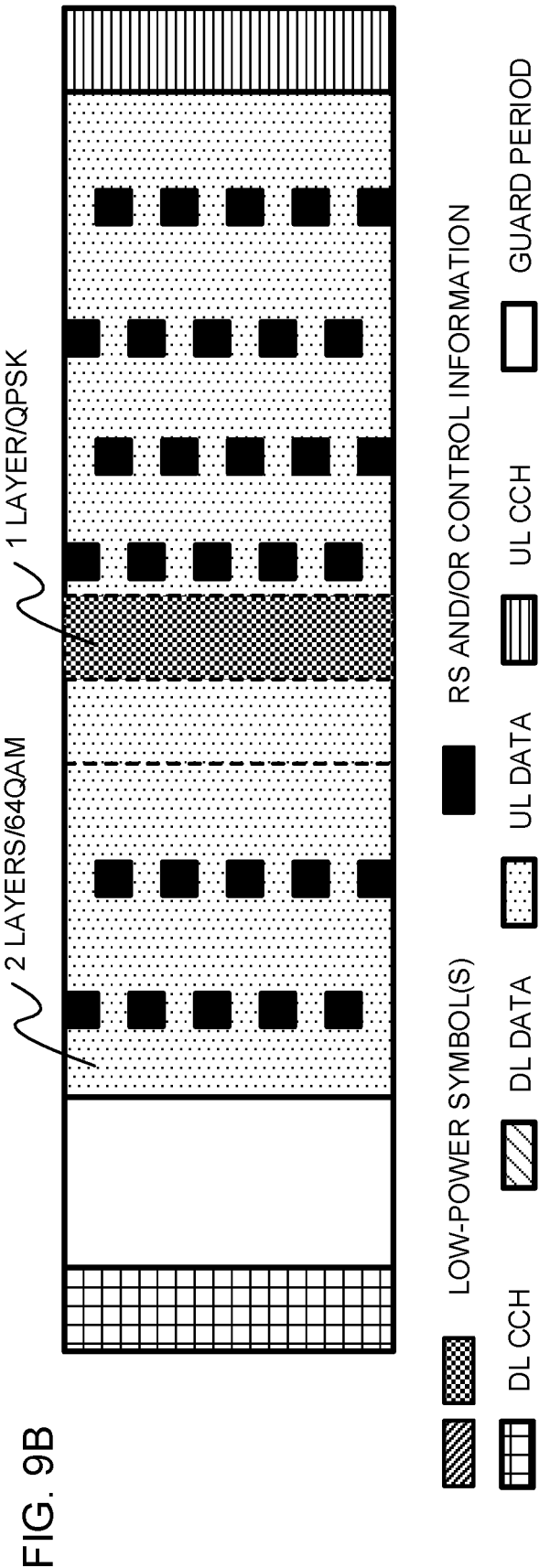
FIG. 9A
FIG. 9B

DL CCH    DL DATA    UL DATA    UL CCH    GUARD PERIOD

TERMINAL AND RADIO COMMUNICATION METHOD FOR REDUCING INTERFERENCE AGAINST PREDETERMINED SIGNALS

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: evolved Node B) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

For example, in existing TDD, whether a subframe is used in the UL or the DL is determined strictly based on its UL/DL configuration (also referred to as "UL-DL configuration"). To be more specific, in radio communication systems using TDD, the UL/DL configuration is set forth to show the configuration (ratio) of uplink subframes and downlink subframes in a radio frame. FIG. 1 is a diagram to show UL/DL configurations in existing LTE. As shown in FIG. 1, in existing LTE, seven UL/DL configurations 0 to 6 are set forth.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Summary of Invention

Technical Problem

In future radio communication systems (for example, 5G), it may be possible to ensure stable communication over a wide coverage with cells that use low frequencies (referred to as, for example, "macro cells"), while also supporting high-speed communication with cells that use high frequencies (referred to as, for example, "small cells"). High frequencies are suitable for use in a wide band, so that TDD is preferable for achieving increased peak rates.

Generally, the UL-DL traffic ratio is not always constant, and changes over time or between locations. For this reason, radio communication systems that use TDD are expected to use radio resources, efficiently, by dynamically changing the UL/DL resource format in a given cell (a transmission point, a radio base station, etc.) in accordance with the variation of traffic.

So, in 5G, a scheme (also referred to as "dynamic TDD," "eIMTA (enhanced Interference Mitigation and Traffic Adaptation)," and so on) for dynamically or semi-statically changing the ratio of transmission of DL subframes and UL subframes in the time domain, per transmission/reception point (radio base station, user terminal, cell and others), is under study.

In dynamic TDD, a study is in progress to implement independent UL/DL control for each transmission point. However, when independent control is applied, it may occur that the direction of transmission (direction of communication) is controlled differently between adjacent transmission points. In this case, significant interference may be produced between the UL and the DL, and the quality of communication is at risk of deterioration. Important signals such as control signals particularly demand reduction of interference.

The present invention has been made in view of the above, and it is therefore an object of the present invention to provide a user terminal and radio communication method, whereby, even when UL/DL is controlled on a dynamic basis, interference against predetermined signals can be adequately reduced.

Solution to Problem

A user terminal according to one aspect of the present invention has a receiving section that monitors a downlink control channel, which is allocated in units of subframes, and receives downlink control information; and a control section that controls data transmission and/or receipt of data reception, in units of transmission time intervals (TTIs), based on the downlink control information, wherein the control section controls the transmission and/or receipt reception, assuming on the assumption that at least one of a subframe duration and a TTI duration is variable.

Advantageous Effects of Invention

According to the present invention, even when UL/DL is controlled on a dynamic basis, interference against predetermined signals can be adequately reduced.

BRIEF DESCRIPTION OF DRAWINGS

FIG. 1 is a diagram to show UL/DL configurations in existing LTE;

FIGS. 3A to 3D are diagrams to show examples of subframe configurations according to a dynamic TDD implementation method 2;

FIGS. 5A to 5D are diagrams to show other examples of subframe configurations according to dynamic TDD implementation method 2;

FIGS. 8A and 8B are diagrams to show other examples of subframe configurations according to the second embodiment;

FIGS. 9A and 9B are diagrams to show yet other examples of subframe configurations according to the second embodiment;

DESCRIPTION OF EMBODIMENTS

Figure 2A:
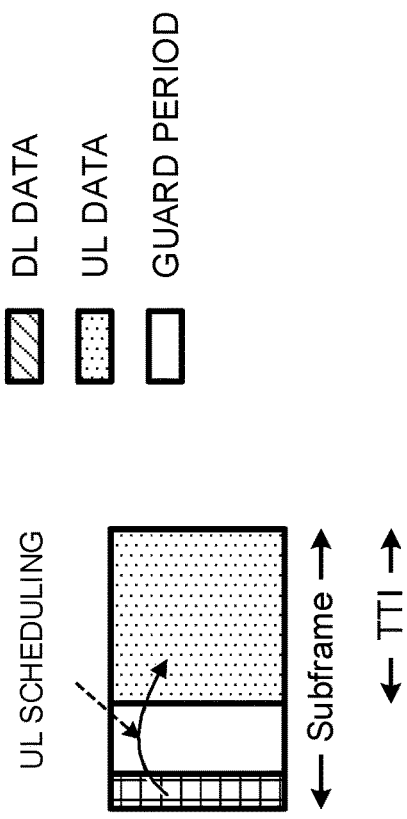
FIGS. 2A to 2D are diagrams to show examples of subframe configurations according to a dynamic TDD implementation method 1.

The present inventors have studied a broad range of 5G's use cases and so on, and, considering interference, spectral efficiency and others, come up with subframe configurations for dynamic TDD that are suitable for 5G.

Now, embodiments of the present invention will be described in detail below with reference to the accompanying drawings. First, subframe configurations for dynamic TDD will be described with the first embodiment. Then, with subsequent embodiments, interference control methods primarily assuming these subframe configurations will be described.

(Radio Communication Method)

First Embodiment

As methods of implementing dynamic TDD, a number of methods can be defined, for example, depending on the relationship between subframes, which are units for controlling time resources, and transmission time intervals (TTIs), which are units for mapping transport blocks (TBs). A TTI may be referred to as a "DL/UL data period," a "data burst period," and so on.

Possible methods of implementation include a method of fixing the subframe duration and making the TTI duration variable (method 1). There is also a method of configuring the subframe duration such that a TTI does not span multiple subframes (method 2). These methods will be explained below.

FIG. 2 is a diagram to show an example of subframe configuration according to the dynamic TDD implementation method 1. In method 1, the subframe duration is specified in the specification, or configured in the UE by, for example, higher layer signaling (for example, RRC signaling, broadcast information (MIB (Master Information Block), SIB (System Information Block), etc.)).

Meanwhile, the TTI duration (which is, for example, the number of symbols where a TB is mapped) is configured by higher layer signaling, physical layer signaling (for example, downlink control information), or a combination of these. For example, information related to TTI duration is included in DL assignments, which schedule receipt in the DL, and/or in UL grants, which schedule transmission in the UL, A UE may judge the TTI duration, for every transmission and reception, based on this information. Note that a TTI is a time period for transmitting and/or receiving data. A TTI may be defined as a time period including a time period for transmitting and/or receiving data, a time period of a control CH, and/or a GP.

The UE monitors a downlink control channel (DL CCH) in the cycle of subframes and/or at predetermined timings, and decides to perform DL receipt and/or UL transmission based on downlink control information that is successfully decoded. Here, while DL receipt and/or UL transmission are in progress (during periods in which transmission/receipt of data is commanded), the monitoring of the DL CCH by the UE can be skipped (omitted, not implemented, or disregarded). In this case (for example, when a TTI is long), the resource for the DL CCH can be used to transmit and receive data, so that it is possible to reduce the overhead, and improve the spectral efficiency.

Although FIG. 2 show examples in which a DL CCH is allocated to the beginning of a subframe, these examples are not limiting. For example, a subframe configuration, in which the DL CCH is allocated to a position other than the beginning of a subframe, such as the end of a subframe, may be used.

Note that a subframe configuration, in which DL data (DL data channel) is transmitted/received may be referred to as a "DL data/subframe/configuration." Also, a subframe configuration in which UL data (UL data channel) is transmitted and received may be referred to as a "UL data subframe configuration." In addition, signals other than data (for example, reference signals (RSs), control signals, etc.) may be transmitted and received in, at least, part of the resources (for example, time and/or frequency resources) where transmission/receipt of data are anticipated.

FIG. 2A shows an example of a subframe configuration for DL data, in the event the TTI duration does not exceed the subframe duration. The UE can determine the schedule of receipt of DL data in the same subframe (one TTI) based on a downlink control signal that is received in the DL CCH.

Figure 2B:
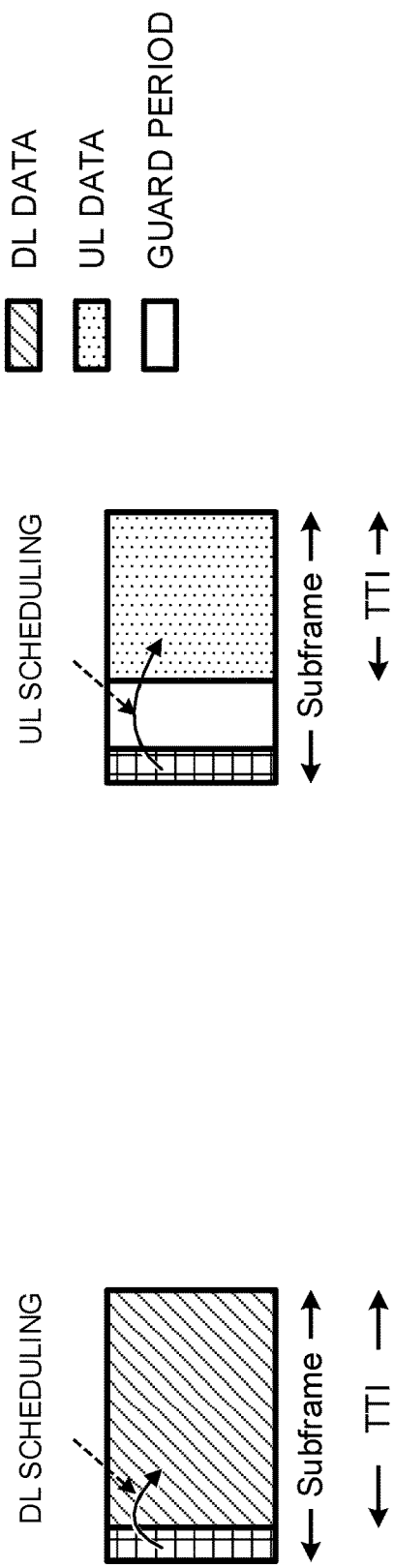

FIG. 2B shows an example of a subframe configuration for DL data in the event the TTI duration is longer than the subframe duration. The UE can determine the schedule of receipt of DL data in multiple consecutive subframes (one TTI) based on a downlink control signal that is received in the DL CCH.

Figure 2C:
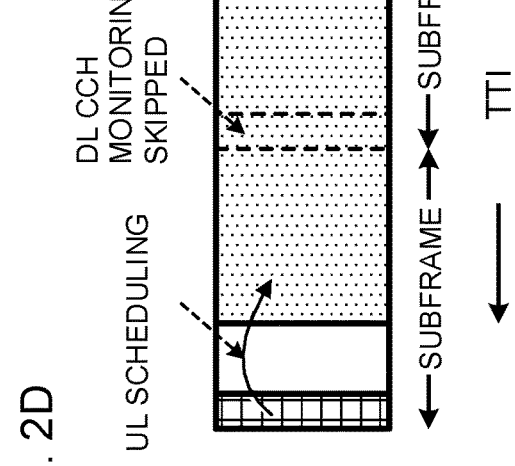

FIG. 2C shows an example of a subframe configuration for UL data in the event the TTI duration does not exceed the subframe duration. The UE can determine the schedule of transmission of UL data in the same subframe (one TTI) based on a downlink control signal that is received in the DL CCH.

Note that a transmission-free period (which may be referred to as a "guard period (GP)," a "gap," a "switching gap," etc.) is provided between DL receipt and UL transmission. The GP allows it to switch between the UL and the DL within a subframe. The GP may be adjusted (configured) on the assumption that the UE employs timing advance (TA).

Figure 2D:
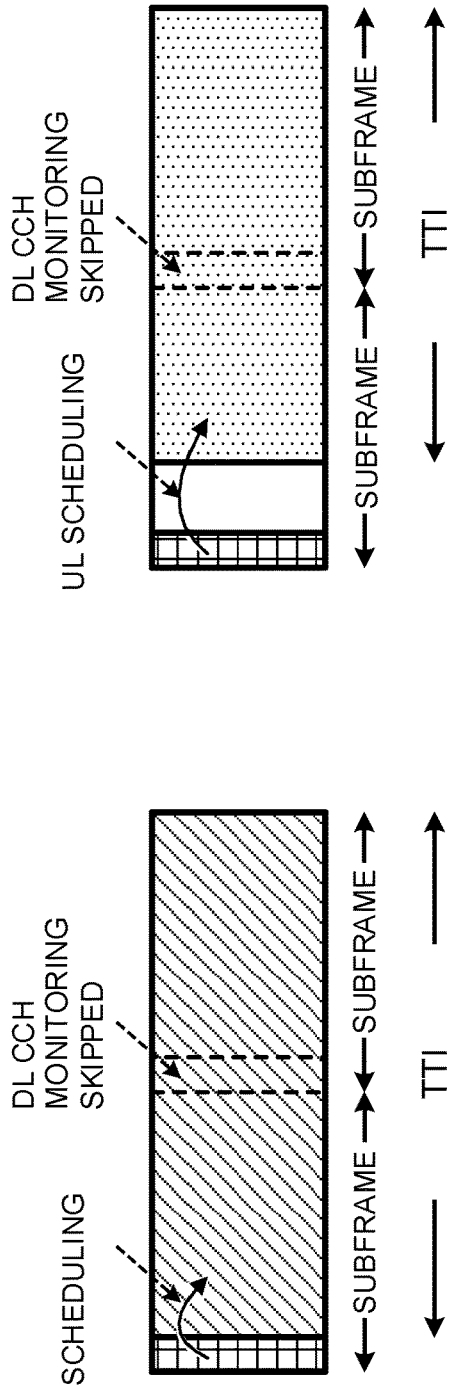

FIG. 2D shows an example of a subframe configuration for DL data in the event the TTI duration is longer than the subframe duration. The UE can determine the schedule of transmission of UL data in multiple consecutive subframes (one TTI) based on a downlink control signal that is received in the DL CCH.

Note that, although FIG. 2 and subsequent drawings show examples in which a DL CCH and data that is scheduled by this DL CCH are mapped at least to the same subframe, but this is by no means limiting. For example, a DL CCH and data scheduled by the DL CCH may be mapped to different subframes.

FIG. 3 provide diagrams to show examples of subframe configurations according to dynamic TDD implementation method 2. In method 2, the subframe duration and/or the TTI duration may be determined as in method 1. However, considering use case and operations, a subframe is configured so that one TTI can be accommodated therein. That is, the subframe duration is configured to be equal to or greater than the TTI duration. FIGS. 3A to 3D correspond to FIGS. 2A to 2D, respectively, and, when the TTI duration is configured large, the subframe duration is configured even bigger, so that it is possible to complete transmission and receipt of TB of data within a subframe.

Although the UE monitors the DL CCH in the cycle of subframes and/or at predetermined timings, given that the DL CCH is mapped to a fixed place in a subframe for certain, there is no need to skip the monitoring of the DL CCH. That is, since the DL CCH is never replaced with DL/UL data, it is easy to control interference. For example, control (scheduling) can be executed so that cases where the DL CCH and UL data collide among a number of cells are prevented from occurring.

Subframe configurations used in dynamic TDD may include an uplink control channel (UL CCH). FIG. 4 provide diagrams to show other examples of subframe configurations according to dynamic TDD implementation method 1. FIGS. 4A to 4D show examples, in which, based upon the frame configurations of FIG. 2A to 2D, respectively, a UL CCH, not DL data, is allocated at the end of a subframe, but these are not limiting. For example, a subframe configuration, in which the UL CCHs is allocated to a position other than the end of a subframe, such as the beginning of a subframe, may be used.

Figure 4C:
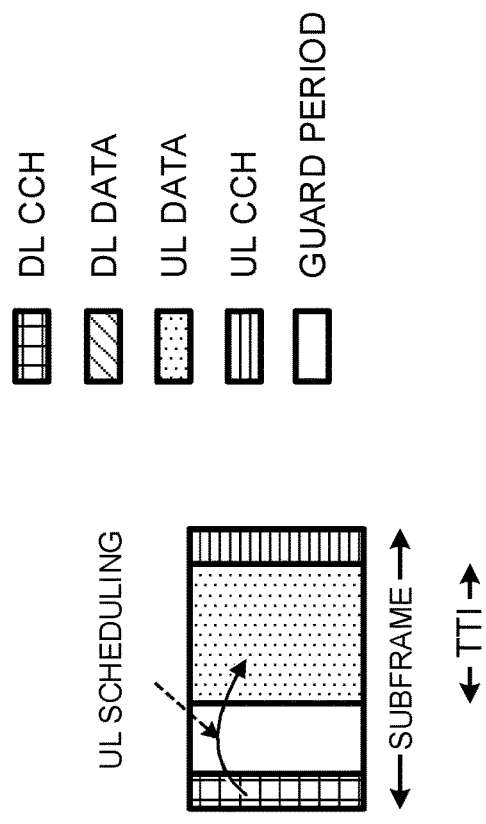
FIGS. 4A to 4D are diagrams to show other examples of subframe configurations according to dynamic TDD implementation method 1.
Figure 4D:
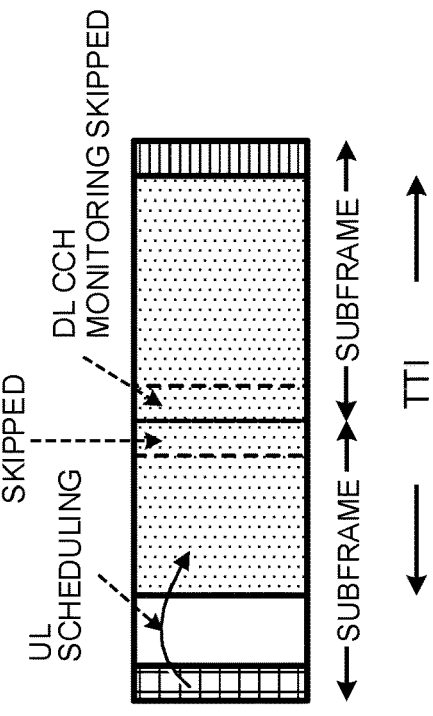
Figure 4A:
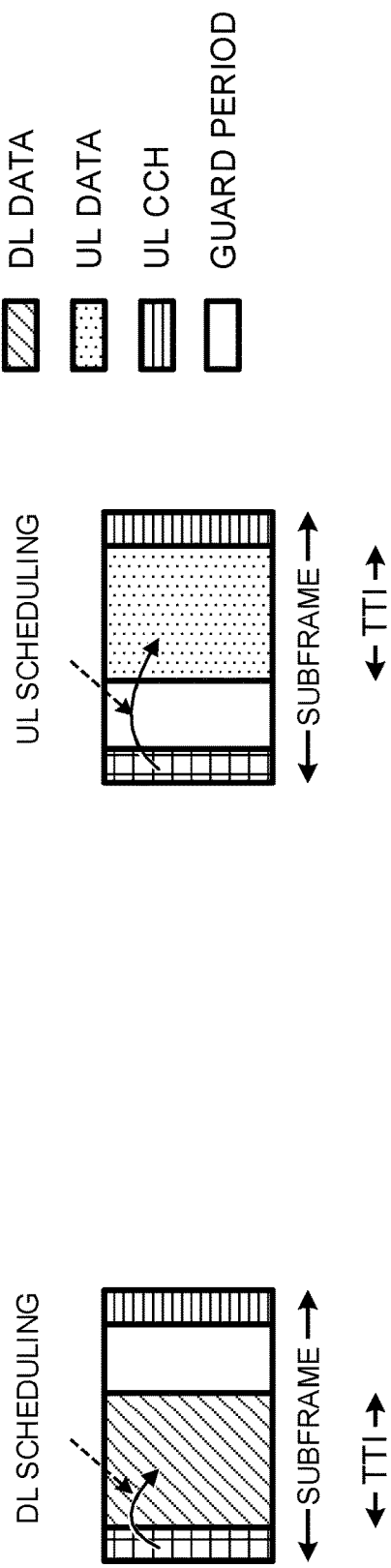
Figure 4B:
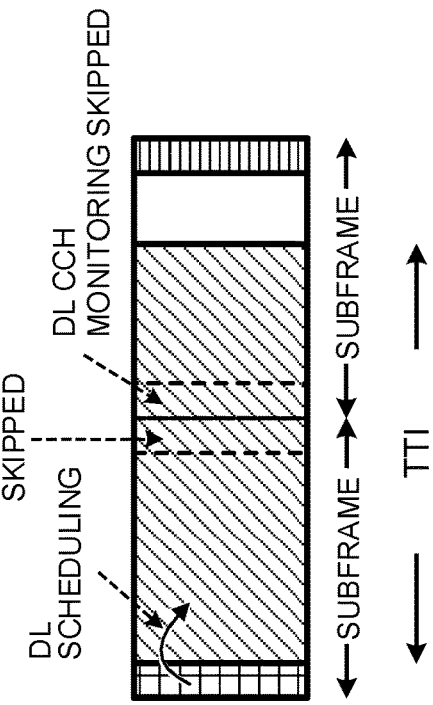

In FIGS. 4A and 4B where DL data is allocated before UL CCH, a GP is provided between DL data and the UL CCH. Also, in method 1, while DL receipt and/or UL transmission are in progress, the UE can skip UL CCH transmission (allocation). In this case (for example, when a TTI is longer than one subframe, as in FIGS. 4B and 4D), the resource for the UL CCH can be used to transmit and receive data, so that it is possible to reduce the overhead, and improve the spectral efficiency.

Note that method 1 (examples of FIGS. 2 and FIG. 4) may be configured so as not to skip either or both of DL CCH monitoring and UL CCH transmission. For example, referring to the example of FIG. 2B and FIG. 4B, a configuration can be adopted in which a DL CCH that is included in the middle of a time period where a TTI of DL data is mapped to span a plurality of subframes is not skipped (that is, the DL data and the DL CCH are time-multiplexed). At this time, the UE receives and decodes the DL data corresponding to this DL CCH time period assuming that this DL data is punctured or subject to rate matching.

Alternatively, referring to the examples of FIG. 2D and FIG. 4 D, a configuration can be adopted in which a UL CCH that is included in the middle of a time period where a TTI of UL data is mapped to span a plurality of subframes is not skipped (that is, the UL data and the UL CCH are time-multiplexed). At this time, the UE applies puncturing or rate matching to the UL data corresponding to this UL CCH time period. As a result if this, even when a TTI that spans a plurality of subframes shows up, it is possible to transmit and receive the DL and/or UL CCH without delaying the timings, so that the latency due to control signals can be reduced.

FIG. 5 provide diagrams, showing other examples of subframe configurations according to dynamic TDD implementation method 2. In method 2, the subframe duration and/or the TTI duration may be determined in the same way as in method 1. FIGS. 5A to 5D show examples, in which, based upon the frame configurations of FIG. 3A to 3D, respectively, a UL CCH, not DL data, is allocated at the end of a subframe, but these are not limiting. In the examples of FIG. 5, there is no need to skip DL CCH monitoring and/or UL CCH transmission. Therefore, control (scheduling) can be executed adequately so that case where the DL CCH and UL data (also, the UL CCH and DL data) collide among a number of cells are prevented from occurring.

According to the first embodiment described above, subframe configurations that are suitable for dynamic TDD can be employed.

Second Embodiment

In studying the subframe configurations for dynamic TDD shown with the first embodiment above, the present inventors have found out that problems that relate to interference may underlie. To be more specific, for example, when adopting the subframe configuration of method 1, DL/UL data may interfere with the DL/UL CCH. This problem will be explained with reference to FIG. 6.

Figure 6A:
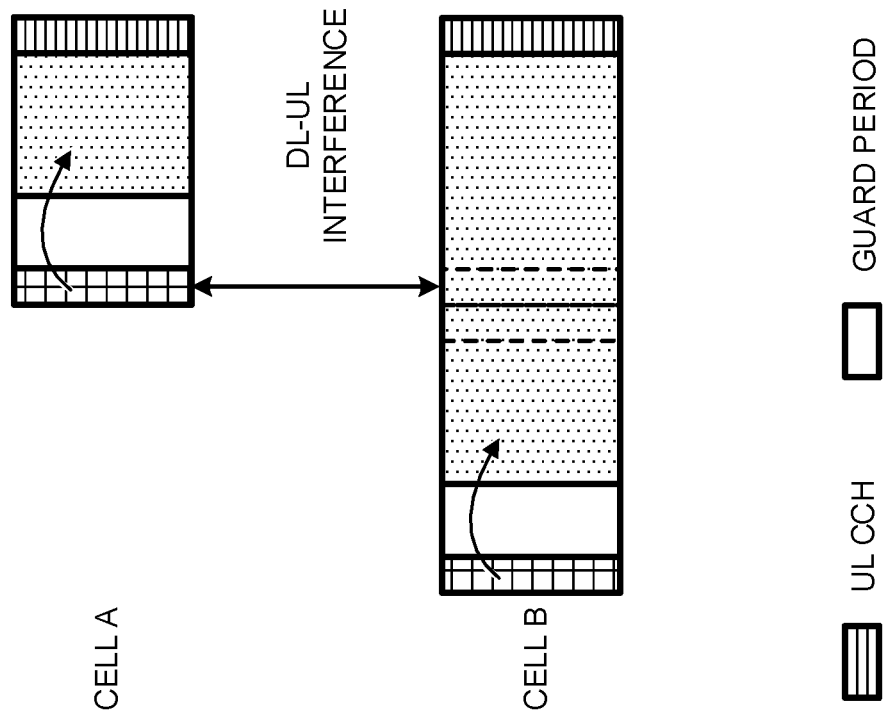
FIGS. 6A and 6B are diagrams to show examples of interference between a control channel and a data channel.
Figure 6B:
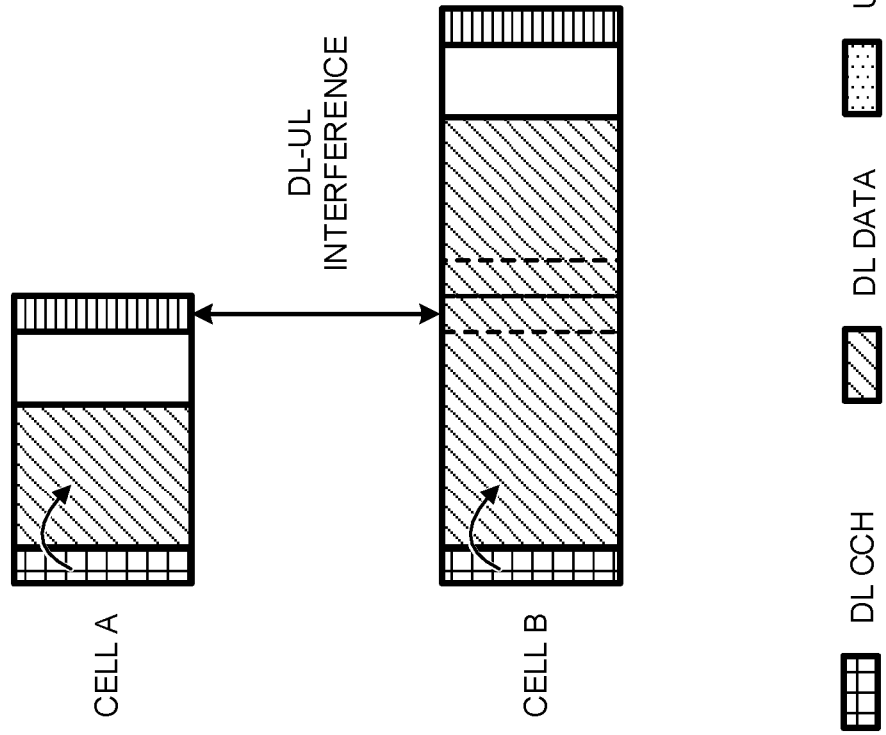

FIG. 6 provide diagrams, showing examples of interference between a control channel and a data channel. FIG. 6A shows DL data subframe configurations in multiple cells (cell A and cell B), FIG. 6B shows UL data subframe configurations in multiple cells (cell A and cell B). In the examples of FIG. 6, the subframe boundaries of cell A and cell B match (synchronize), and the TTI duration of cell A is shorter than the TTI duration of cell B.

In FIG. 6A, the UL CCH of cell A is allocated at the same timing as DL data for cell B. Furthermore, in FIG. 6B, the DL CCH of cell A is allocated at the same timing as UL data of cell B. For example, if cell A and cell B are adjacent, interference may be produced between DL-UL signals transmitted at these timings. FIG. 6A assumes that the received quality of the UL CCH in the eNB of cell A is deteriorated significantly, and FIG. 6B assume that the received quality of the DL CCH in the UE in cell B is deteriorated significantly.

The present inventors have studied the problems described above, and come up with a control method that reduces interference between DL/UL CCHs and DL/UL data, arriving at a second embodiment. With the second embodiment, data is transmitted with low transmission power (low power period) in time periods (for example, in the first and/or last symbols in a subframe) that may overlap DL/UL CCHs, so that, even when data interferes with the DL/UL CCH, the amount of interference can be reduced.

Figure 7B:
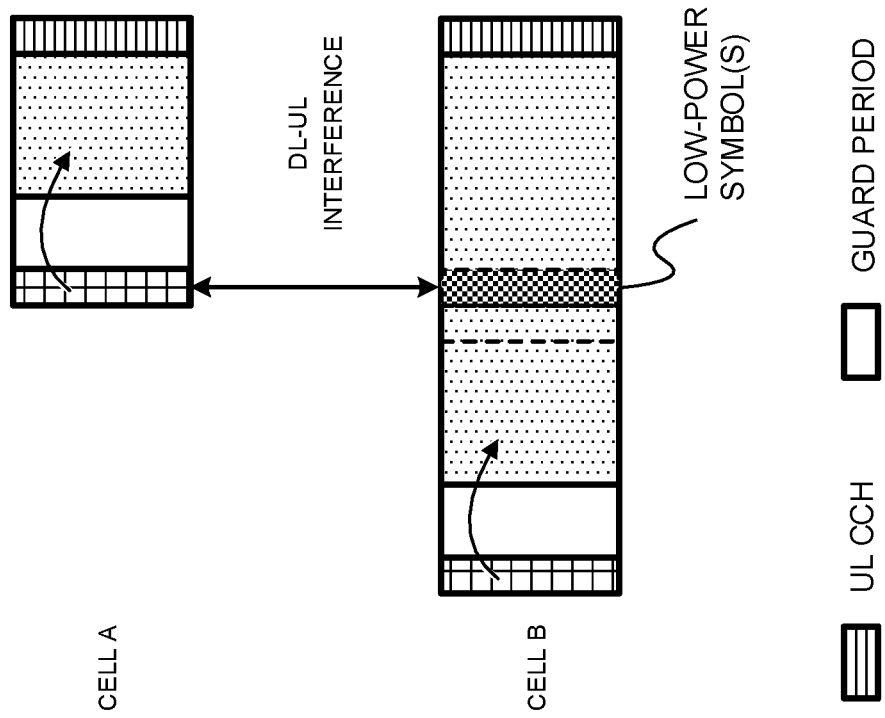
FIGS. 7A and 7B are diagrams to show examples of subframe configurations and interference control according to a second embodiment of the present invention.
Figure 7A:
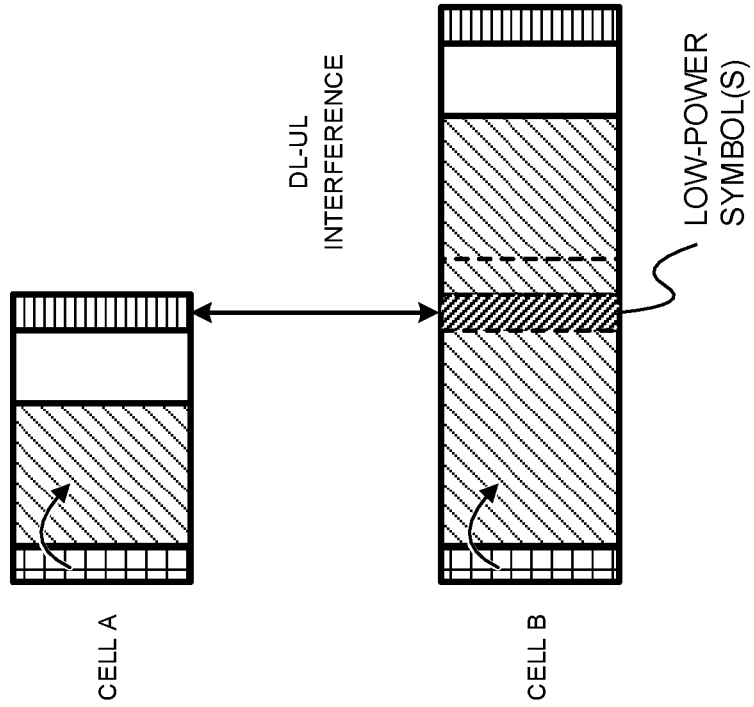

FIG. 7 provide diagrams to show examples of subframe configurations and interference control according to the second embodiment. FIGS. 7A and 7B correspond to FIGS. 6A and 6B, respectively. FIG. 7 shows time fields of data that is transmitted with low transmission power as "low-power symbols."

In FIG. 7A, the UE, which transmits and receives data by skipping the DL/UL CCH in order to transmit and receive data (TB) over a plurality of subframes, may perform receiving processes (for example, demapping, demodulation, decoding, etc.) on the assumption that the DL data pertaining to the time period (period) of the skipped UL CCH is transmitted with lower power than in other time periods (for example, other DL data periods).

While data is being transmitted over multiple subframes with low transmission power, the eNB can transmit DL data in time periods of a UL CCH and/or a DL CCH that may be transmitted in other cells.

In FIG. 7B, the UE, which transmits and receives data by skipping the DL/UL CCH in order to transmit and receive data (TB) over a plurality of subframes, may transmit the UL data pertaining to the time period of the skipped DL CCH with lower power than in other time periods (for example, other UL data periods).

While data is being received over multiple subframes, the eNB may perform receiving processes on the assumption that UL data is transmitted with low transmission power in time periods of a UL CCH and/or a DL CCH that may be sent in other cells.

Information related to the power gap between low power periods and other time periods may be configured (reported) in the UE by higher layer signaling. For example, for this information, information related to the offset relative to the transmission power in other time periods (for example, the transmission power of a physical downlink shared channel (PDSCH)/uplink shared channel (PUSCH), the transmission power of reference signals transmission power, etc.) may be reported. Note that information other than power gap-related information may be reported as long as the information can specify the power in low power period.

In FIG. 7A, the DL data pertaining to the time period of the DL CCH where monitoring is skipped may be transmitted with lower power than in other time periods. Also, in FIG. 7B, the UL data pertaining to a UL CCH time period where transmission is skipped may be transmitted with lower power than in other time periods. That is, low power periods may be UL CCH and DL CCH time periods. In this case, different transmission power may be configured between data pertaining to a DL CCH time period and data pertaining to a UL CCH time period.

Note that, in the second embodiment, the transmission power in low power periods has only to be lower than in other time periods, and, for example, zero transmission power may be applied (that is, the transmission power is 0, or it may be possible to say that "transmission is dropped," etc.). In this case, the puncturing or the rate matching process may be applied to the DL/UL data, so as not to map resources to low power periods.

When puncturing is applied, control is performed so that data is punctured after data is generated on the assumption that resources of low power periods can be used. In the event rate matching is used, control is executed so that, on the assumption that data cannot be mapped to resources in low power periods, signals are generated with a small amount of data and allocated to other allocation resources.

Low power periods will be described in greater detail with reference to FIG. 8 and FIG. 9. FIG. 8 provide diagrams to show other examples of subframe configurations according to the second embodiment. FIG. 8A shows two DL data subframes constituting one TTI, and FIG. 8B shows two UL data subframes constituting one TTI.

As shown in FIG. 8A, basically, information elements other than DL data (TB), such as RSs and L1/L2 control information (for example, downlink control information (DCI), can be mapped to DL data time periods. Meanwhile, it is possible to employ a configuration in which information elements other than DL data are not mapped (only DL data is transmitted) in DL data time periods pertaining to time periods of a DL CCH and/or a UL CCH that are skipped. As a result of this, it is possible to reduce the possibility that RSs or control signals receive interference from, for example, UL CCHs that are transmitted in other cells.

As shown in FIG. 8B, basically, information elements other than UL data (TB), such as RSs and L1/L2 control information (for example, UCI (Uplink Control Information)) can be mapped to UL data time periods. Meanwhile, it is possible to employ a configuration in which information elements other than UL data are not mapped (UL data is transmitted) in UL data time periods pertaining to time periods of DL CCHs and/or UL CCHs that are skipped. As a result of this, it is possible to reduce the possibility that RSs or control signals receive interference from, for example, DL CCHs that are transmitted in other cells.

Note that, although FIG. 8 shows an example in which the locations (mapping pattern) of radio resource where information elements other than data are mapped are the same between the subframe for DL data and the subframe for UL data, this is not limiting. For example, the mapping pattern of information elements other than data may be different between DL data subframes and UL data subframes.

In a data time period corresponding to a time period of a skipped DL CCH, data may be transmitted and received with a modulation scheme with a lower modulation order and/or in a smaller number of MIMO (Multiple-Input Multiple-Output) layers, than in other time periods. Also, in a time period of data corresponding to a time period of a skipped DL CCH, data may be transmitted and received with a modulation scheme with a lower modulation order and/or in a smaller number of MIMO layers than in other time periods.

FIG. 9 provide diagrams to show yet other examples of subframe configurations according to the second embodiment. FIGS. 9A and 9B are diagrams similar to FIGS. 8A and 8B, respectively. In FIG. 9A, in a time period for DL data, which corresponds to a time period for a UL CCH that is skipped, the UE may perform receiving processes on the assumption that the number of MIMO layers is two and DL data is transmitted using 16 QAM (Quadrature Amplitude Modulation). Meanwhile, in other DL data time periods, the UE may perform receiving processes on the assumption that the number of MIMO layers is four and DL data is transmitted using 256 QAM.

In FIG. 9B, in a time period for UL data, which corresponds to a time period for a DL CCH that is skipped, the UE may exert control so that the number of MIMO layers is one and UL data is transmitted in QPSK (Quadrature Phase-Shift Keying). Meanwhile, in other UL data time periods, the UE may exert control so that the number of MIMO layers is two and UL data is transmitted in 64 QAM. Note that the numbers of layers and the modulation schemes shown in FIG. 9 are examples, and these are by no means limiting.

According to the second embodiment described above, it is possible to reduce the interference that DL/UL CCHs in predetermined cells receive from other cells' DL/UL data.

Noe that, with the above examples, the second embodiment has been described on the premise of method 1 of the first embodiment, but the control according to the second embodiment may be applied to method 2 as well. For example, when different subframe durations are used among a plurality of cells (for example, adjacent cells), in a cell with a longer subframe duration, control may be exerted so that, in a time period for a UL CCH and/or a DL CCH that may be transmitted in a cell where the subframe duration is shorter, data is transmitted and/or received with low transmission power.

In the second embodiment, the base station may transmit or receive information related to at least one of the operating subframe duration, the operating TTI duration and time resources of control CHs (for example, the locations of DL CCH and/or UL CCH resources), to other base stations or from other base stations, via the X2 interface, for example. Based on at least one of these pieces of information, the base station can reduce the transmission power for DL data, just as little as possible so as to prevent the quality of communication pertaining to data CHs from deteriorating excessively.

Also, at least one of these pieces of information reported between base stations, may be reported from the eNB to the UE. The UE can reduce the transmission power for UL data just as little as possible, based on at least one of these pieces of information, so as to prevent the quality of communication pertaining to data CHs from deteriorating too much. Also, the UE can perform the receiving processes assuming proper transmission power for DL data.

Third Embodiment

With either method 1 and method 2 shown with the first embodiment, for a purpose of increasing the coverage of DL/UL CCHs, the number of symbols to map either or both control channels may be increased. In this case, the payload of the control channels can be increased, so that the error rate can be improved by lowering the coding rate and/or increasing the spreading factor.

FIG. 10 provide diagrams to show example of subframe configurations in the event the number of mapping symbols for at least one control channel is increased. FIG. 10A shows a DL data subframe, where the number of symbols for a UL CCH is larger than the number of symbols for a DL CCH, and FIG. 10B shows a DL data subframe, where the number of symbols for a DL CCH and the number of symbols for a UL CCH are both greater than one.

Figure 10C:
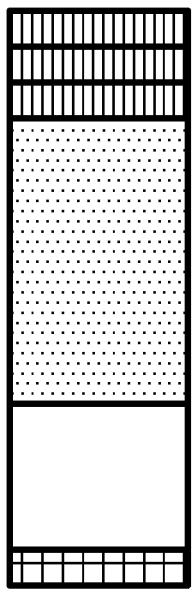
FIGS. 10A to 10D are diagrams to show examples of subframe configurations, where the number of mapping symbols in at least one control channel is increased.
Figure 10D:
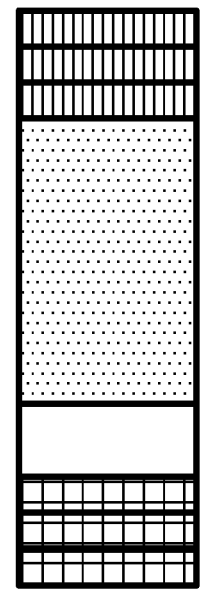
Figure 10A:
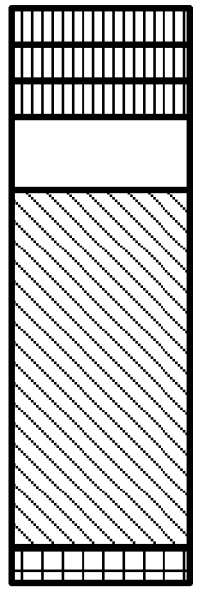
Figure 10B:
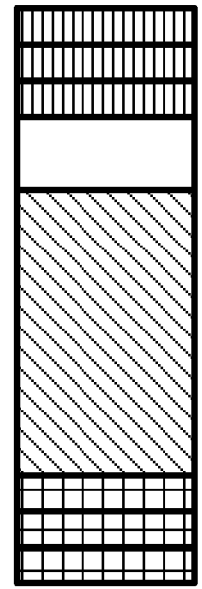

Also, FIG. 10C shows a UL data subframe, where the number of symbols for a UL CCH is larger than the number of symbols for a DL CCH, and FIG. 10D shows the UL data subframe, where the number of symbols for a DL CCH and the number of symbols for a UL CCH are both greater than one.

In addition to these, DL data subframes and/or UL data subframes in which the number of symbols for a DL CCH is larger than the number of symbols for a UL CCH can also be realized.

Note that, when a control CH is transmitted without being skipped, it is preferable that the control CH is configured to be always transmitted in a predetermined symbol. For example, a DL CCH is preferably configured to be transmitted in the first symbol of a subframe, and a UL CCH is preferably configured to be transmitted in the last (end) symbol of a subframe. Symbols in which control channels are anticipated to be transmitted for certain may be referred to as" default control symbols," and symbols for other, additionally allocated control CHs may be referred to as "additional (extended) control symbols." Note that the number of additional control symbols may be 1, 2, 3 and so on, may be the value that is determined by subtracting the number of default symbols from the number of all symbols in the subframe, or may be other values.

Also, information related to at least one of the number of symbols for a DL CCH and/or a UL CCH, the maximum number of symbols and the minimum number of symbols may be configured in the UE by higher layer signaling (for example, RRC signaling), physical layer signaling (for example, DCI), or a combination of these.

However, extending the coverage of control CHs is not always necessary in all cells. Also, in an environment where cells having small coverage areas (referred to as, for example, "small cells") and cells having large coverage areas (referred to as, for example, "macro cells") are co-present, even when the same subframe configuration is used, DL/UL CCHs and DL/UL data CHs of multiple cells may interfere with each other. This problem will be explained with reference to FIG. 11.

Figure 11B:
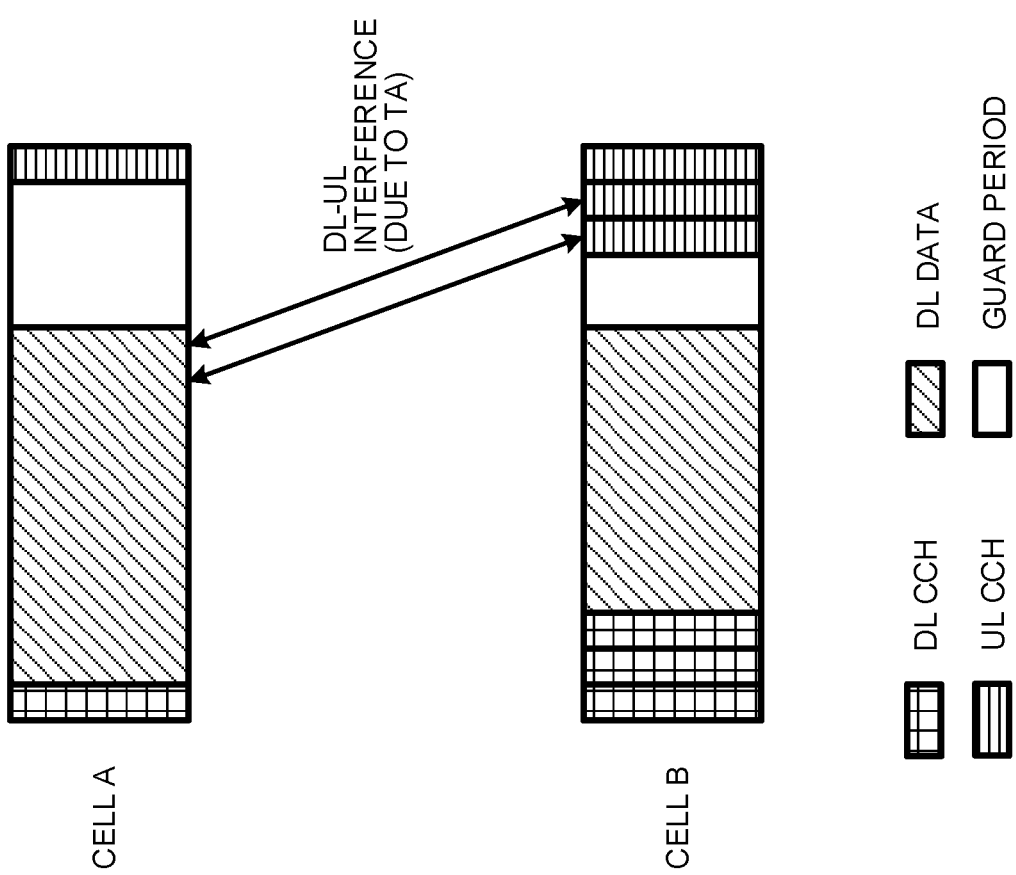
FIGS. 11A and 11B are diagrams to show examples of interference between a control channel and a data channel, where the number of symbols in the control channel is increased.
Figure 11A:
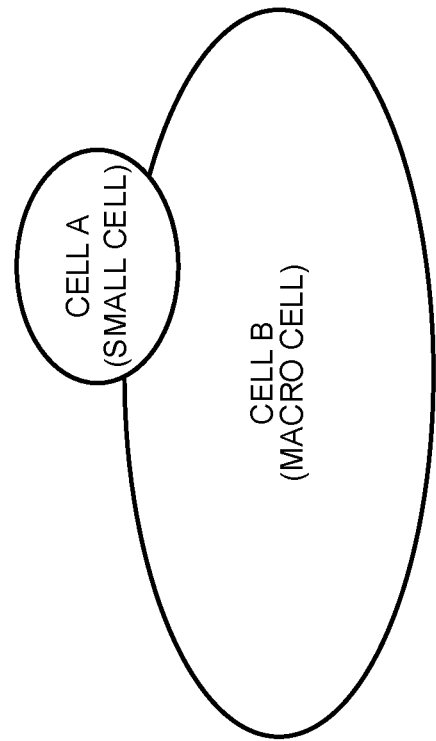

FIG. 11 provide diagrams to show examples of interference between a control channel and a data channel where the number of control channel symbols is increased. FIG. 11A is a schematic diagram to show the positional relationship and the size of cells assumed in this example, and shows a configuration in which cell A, which is a small cell, overlaps the coverage area of cell B, which is a macro cell.

FIG. 11B shows DL data subframe configurations, which a plurality of cells shown in FIG. 11A (cell A and cell B) use in the same period. Although cell A and cell B are illustrated so that their boundaries overlap, because of the limited space in the drawing, in practice, a gap may be produced due to propagation delay. Also, in cell B with the larger coverage area, timing advance (TA) that is greater than in cell A is configured.

The UE dynamically adjusts the transmission timings of UL signals (for example, the timing of the beginning of a UL subframe) based on information which relates to TA (TA information) and which is received from the eNB. The TA information is reported, for example, via MAC (Medium Access Control) control elements.

When the uplink transmission timing is shifted in the time domain based on TA, if the number of UL CCH symbols in cell B is larger than one (in the drawing, three) as shown in FIG. 11B, there is a possibility that the transmission timing of the UL CCH of cell B and the transmission timing of DL data of cell A overlap. In this case, interference of a UL CCH and a DL data CH may be produced between cells A and B.

The present inventors have studied the problems described above, come up with a control method that reduces interference between DL/UL CCHs and DL/UL data even when different TAs are configured between cells, arriving at a third embodiment. According to the third embodiment, data is transmitted with low transmission power (in low power periods) in time periods that may overlap (collide) with DL/UL CCHs, taking TA into consideration (for example, in one or more symbols from the end of a time period for DL data and/or one or more symbols from the beginning of a time period for UL data).

Note that the second embodiment can be seen as case in which, in the third embodiment, there is no TA difference between cells. For this reason, control methods that have been described with the second embodiment such as mapping can be used alike in the third embodiment. The third embodiment is suitable when the number of DL/UL CCH symbols in a given cell is two or more, but may also be applied to a CCH where the number of symbols is one. Also, the power control based on the number of symbols according to the third embodiment can be applied to any of methods 1 and 2 of the first embodiment.

Figure 12B:
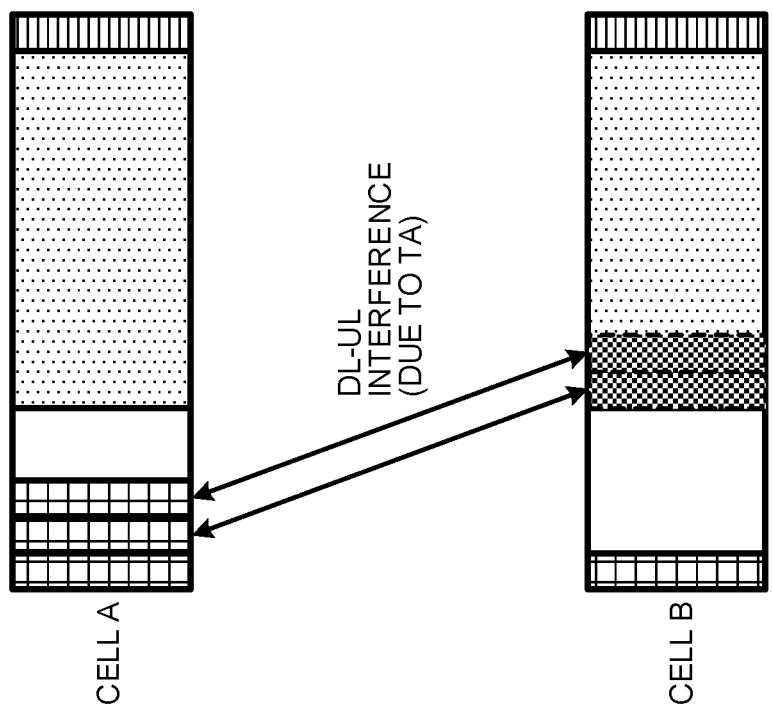
FIGS. 12A and 12B are diagrams to show examples of subframe configurations and interference control according to a third embodiment of the present invention.
Figure 12A:
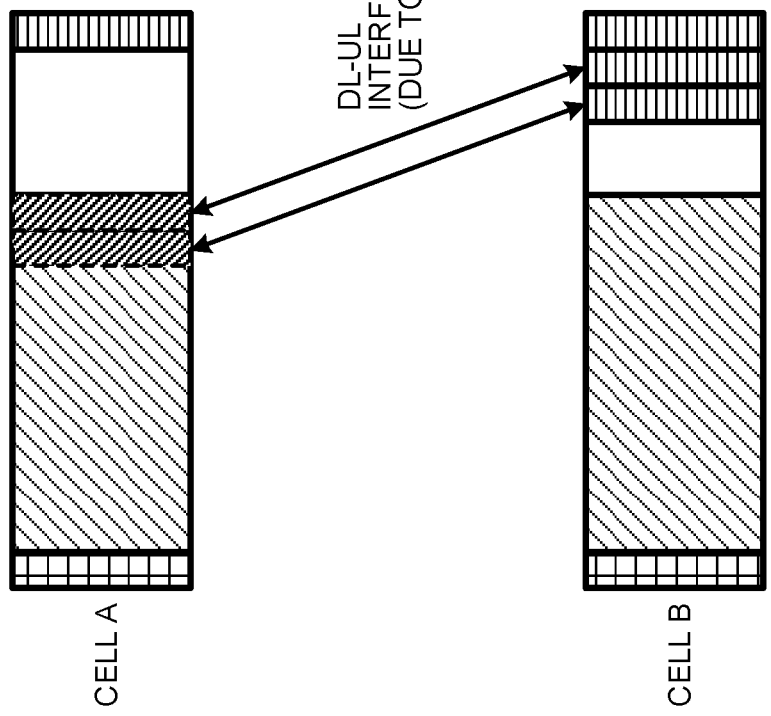
Figure 13C:
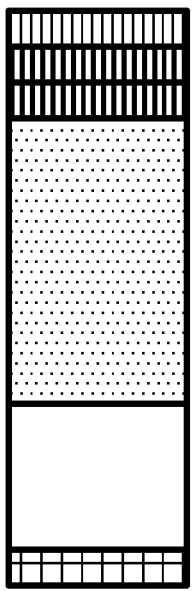
FIGS. 13A to 13D are diagrams to show examples of subframe configuration according to a fourth embodiment of the present invention.
Figure 13D:
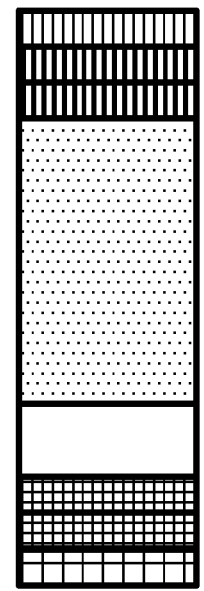
Figure 13A:
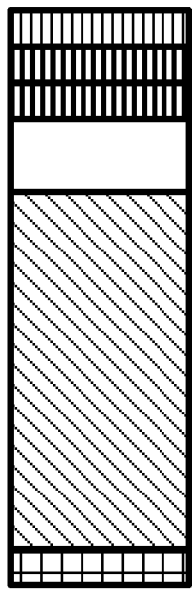
Figure 13B:
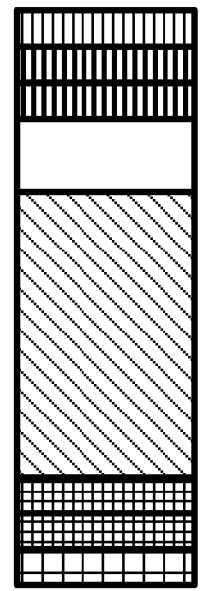

FIG. 12 provide diagrams to show examples of subframe configurations and interference control according to the third embodiment. FIG. 12A shows subframe configurations for DL data for a plurality of cells (cell A and cell B) shown in FIG. 11, and shows subframe configurations for UL data for a plurality of cells shown in FIG. 11. As described above, in cell B, the TA is configured larger than in cell A.

In FIG. 12A, the number of UL CCH symbols in cell B is three, so that, considering TA, the base station forming cell A transmits DL data (for example, the last two symbols) that may interfere with the above UL CCH, with lower power than in other time periods (for example, other DL data periods). Thus, even when the UL CCH of cell B collides with DL data of cell A, given the transmission power of the DL data is low, the interference against the UL CCH can be reduced.

In FIG. 12B, the number of DL CCH symbols in cell A is three, so that, considering TA, the UE that communicates in cell B transmits UL data (for example, the first two symbols) that may interfere with the above DL CCH, with lower power than in other time periods (for example, other UL data periods). By this means, even when the DL CCH of cell A collides with UL data of cell B, given that the transmission power of the UL data is low, the interference against the DL CCH can be reduced.

Note that, in FIG. 12, the end timing of DL data in the DL data subframe (GP-starting timing) and/or the starting timing (GP-ending timing) of UL data in the UL data/subframe are constant, in each cell, regardless of the number of control CH symbols, But this is by no means limiting. For example, a configuration, in which the length of GP varies depending on the number of control CH symbols, may be employed.

Also, in order to implement the control described above with reference to FIG. 12, the base station may transmit or receive at least one of information regarding time resources for controls CHs (for example, the number of symbols to use for mapping of DL CCHs and/or UL CCHs), and TA information, to other base stations or from other base stations, via the X2 interface, for example. Based on at least one of these pieces of information, the base station can reduce the transmission power for DL data, just as little as possible so as to prevent the quality of communication pertaining to data CHs from deteriorating excessively.

Also, at least one of the information related to time resources for control CHs and the TA information may be reported from the eNB to the UE. In addition to these pieces of information (or instead of these pieces of information), information (for example, bit map information to show low-power symbols in a subframe, information to specify low-power symbols, etc.) relating to time resources for data CHs where the transmission power is lowered, may be reported from the eNB to the UE. The UE can reduce the transmission power for UL data, just as little as possible, based on at least one of these pieces of information, so as to prevent the quality of communication pertaining to these data CHs from deteriorating excessively. Also, the UE can perform receiving processes assuming proper transmission power for DL data.

Note that the number of data symbols that are subject to low power transmission may relate to, for example, the number of UL/DL CCH symbols in other cells, may be, for example, the same as, less than, or greater than the number of default control symbols, the number of additional control symbols and the number of control symbols (including both default control symbols and additional control symbols). For example, when the number of control symbols for another cell's UL CCH is three, the last four symbols of DL data may be transmitted with low power.

According to the third aspect described above, the UE can assume that DL data that is received in one or more symbols (for example, a number of symbols at the end) from the end of a DL data CH in a TTI is transmitted with lower power than DL data in other time periods, perform receiving processes of these symbols accordingly. Furthermore, the UE can transmit UL data, which is transmitted in one or more symbols (for example, a number of symbols at the beginning) from the beginning of a UL data CH in a TTI, with lower power than UL data in other time periods. By this means, it is possible to reduce the interference which at least part of DL/UL CCHs in predetermined cells receive from other cells' DL/UL data.

Fourth Embodiment

With the third embodiment described above, a control method with an underlying concept of reducing the interference which control CHs receive from data CHs as much as possible, while expanding the coverage of control CHs, has been shown. By contrast with this, when an increased number of control symbols are provided so as to expand the coverage of control CHs, it is possible to think that minimal control CHs are already reserved with default control symbols (for example, the first or last symbol in control CHs), and that therefore additional control symbols should be used only within a range not increasing interference with data CH.

A fourth embodiment is based on the latter idea. That is, the fourth embodiment provides a control method that makes the transmission power of additional control symbols lower than the transmission power of default control symbols.

FIG. 13 provide diagrams to show examples of subframe configurations according to the fourth embodiment. FIGS. 13A to 13D correspond to FIGS. 10A to 10D, respectively, except that control CH symbols other than the default control symbol (the first symbol of DL CCHs and the last symbol of UL CCHs) are low-power symbols (low-power CCH symbols).

DL/UL CCHs may be configured so that they can be demodulated without using DL/UL CCH time periods where power is configured low. For example, looking at each configuration of FIG. 13, first, a DL/UL control signal is mapped to a default control symbol, so that a DL/UL CCH is configured. Next, the DL/UL CCH is duplicated or spread and mapped to additional control symbols. By doing this, if the communication environment is good, it is possible to correctly demodulate the DL/UL control signal without additional control symbols, and, if the communication environment is poor, the use of additional control symbols helps improve the possibility of successful demodulation.

Also, reference signals that are used to demodulate DL/UL CCHs may be included (mapped) only in default control symbols. Additional control symbols can be demodulated using reference signals that are included in default control symbols. By doing this, it is possible to reduce the overhead of additional control symbols, increase the number of times duplicating, or the spreading factor (which may be seen as the coding rate) of, DL/UL CCHs, and improve the error rate improvement effect by inserting additional control symbols.

Furthermore, reference signals for demodulating DL/UL CCHs may be included (mapped) in additional control symbols, too, in addition to default control symbols. The UE can demodulate the default control symbol and additional control symbols independently, using separate reference signals. By doing this, channel estimation with higher accuracy can be implemented.

Note that information about the power gap between a time period for a low-power control CH and other time periods (for example, time periods for normal-power control CHs) may be configured in the UE by higher layer signaling (for example, RRC signaling), physical layer signaling (for example, DCI), or a combination of these. Note that information that is different from the power-gap-related information may be reported, as long as the information can specify the power of low-power control CHs.

For example, if multiple pieces of power information (where, for example, one piece of power information relates to at least one of the power value, the power ratio, etc.) is pre-configured in the UE by higher layer signaling, the eNB may send information (for example, one bit) that commands switching of power, in downlink control information, to the UE. Based on this command information, the UE can switch and apply the above-mentioned multiple pieces of power information regarding additional control symbols. Furthermore, when an index for specifying power is included in downlink control information, the UE can apply the power information corresponding to this index to additional control symbols.

If the UE knows that a DL CCH is comprised of two or more symbols, the UE may exert control so that receiving processes are performed on the assumption that at least one of the symbols of the DL CCH is transmitted with lower power than the other symbols of the DL CCH. Also, if the UE knows that a UL CCH is comprised of two or more symbols, the UE may exert control so that at least one of the symbols of the UL CCH is transmitted with lower power than the other symbols of the UL CCH.

Figure 14A:
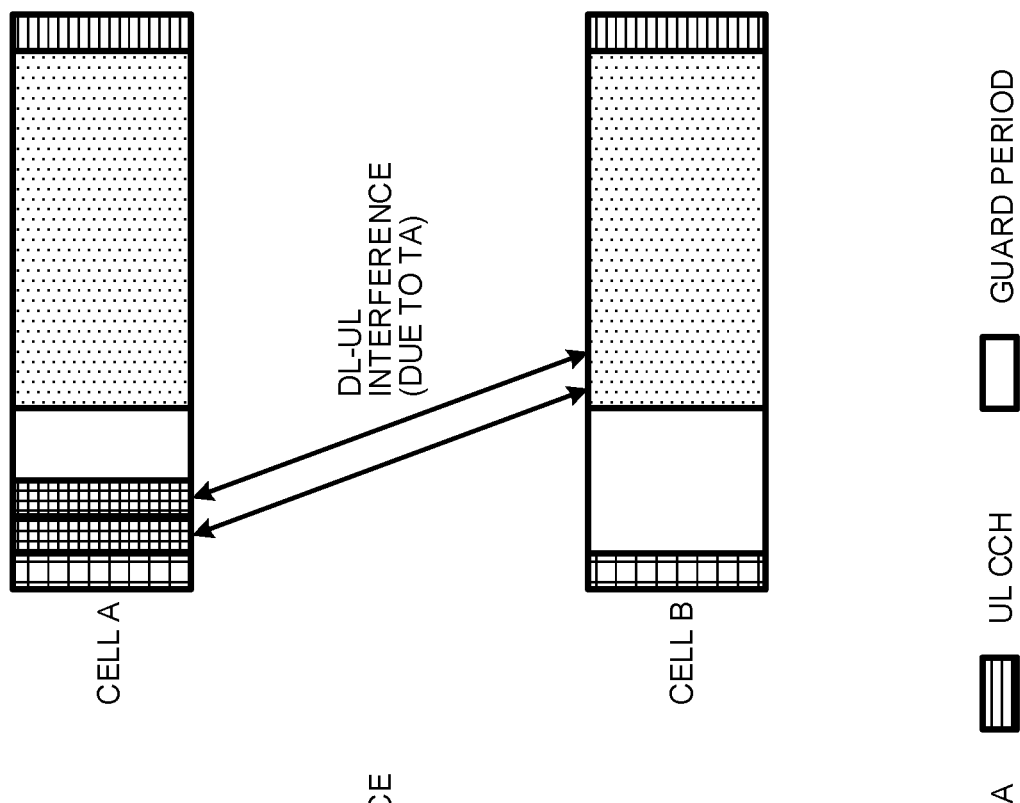
FIGS. 14A and 14B are diagrams to show examples of subframe configurations and interference control according to the fourth embodiment.
Figure 14B:
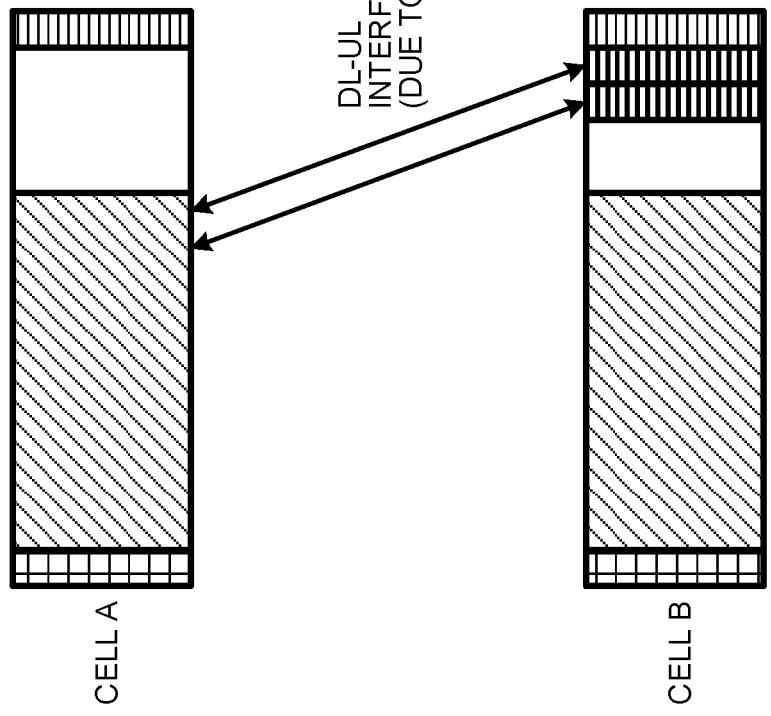

FIG. 14 provide diagrams to show examples of subframe configurations and interference control according to the fourth embodiment. FIGS. 14A and 14B show examples similar to FIGS. 12A and 12B, respectively.

In FIG. 14A, since the number of UL CCH symbols in cell B is three, the UE lowers the transmission power of UL CCH symbols, except for the last symbol. By this means, even when the UL CCH of cell B collides with DL data of cell A, since the transmission power of the UL CCH is low, the interference against the DL data can be reduced.

In FIG. 14B, since the number of DL CCH symbols in cell A is three, the base station forming cell A lowers the transmission power of DL CCH symbols except for the first symbol. By this means, even when the DL CCH of cell A collides with UL data of cell B, the transmission power of the DL CCH is low, so that the interference against the UL data can be reduced.

Note that, with the fourth embodiment, a configuration may be employed, in which the transmission power of default control symbols is lowered in addition to the transmission power of additional control symbols, or instead of this transmission power.

According to the fourth embodiment described above, it is possible to reduce the interference which at least part of DL/UL data in predetermined cells receive from other cells' DL/UL CCHs, while improving the possibility of successful demodulation of DL/UL CCHs in the other cells.

Note that each of the above-described embodiments can be appropriately combined. For example, when increasing the number of control symbols, the transmission power of additional control symbols may be made lower than the transmission power of default control symbols, in accordance with the third and fourth embodiments, while also lowering the transmission power of data symbols that may overlap with control symbols.

Also, in the second embodiment, although an example in which the time periods of both a DL CCH and a UL CCH are one symbol, this is not limiting. For example, in the second embodiment, the time period of a DL CCH and/or a UL CCH may be one or more symbols, and the UE may exert control so as to monitor DL CCHs corresponding to a plurality of symbols and/or skip UL CCH transmission.

Also, a low power period may be made a high power period, in which signals are transmitted with higher transmission power than in other time periods (other data CH periods or other control CH periods). Also, the interference control (power control) methods according to the second to the fourth embodiment may be applied to subframe configurations other than those shown with the first embodiment.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 15:
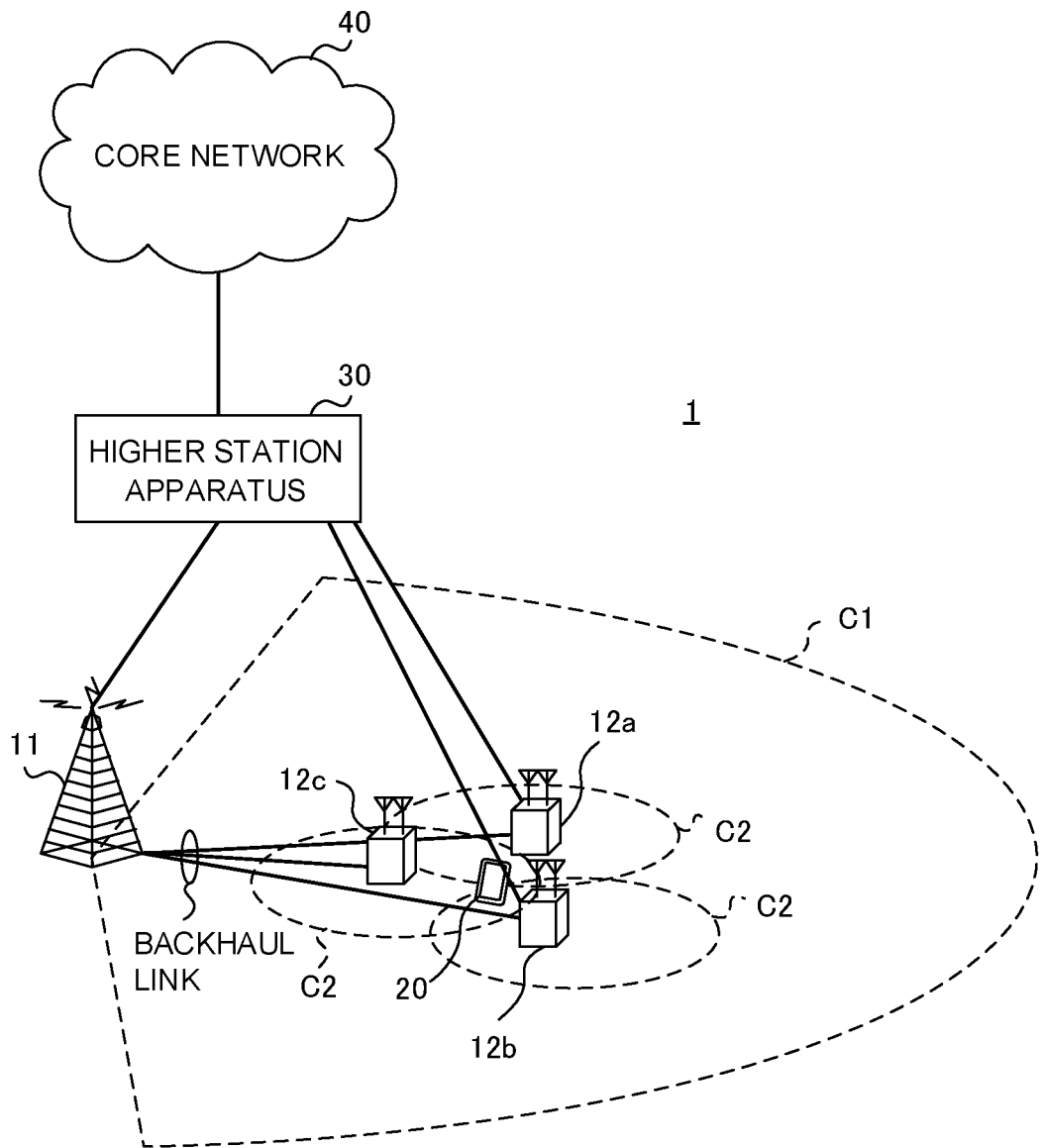
FIG. 15 is a diagram to show an example of a schematic structure of a radio communication system according to one embodiment of the present invention.

FIG. 15 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated. Note that a shared channel may be referred to as a "data channel."

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 16:
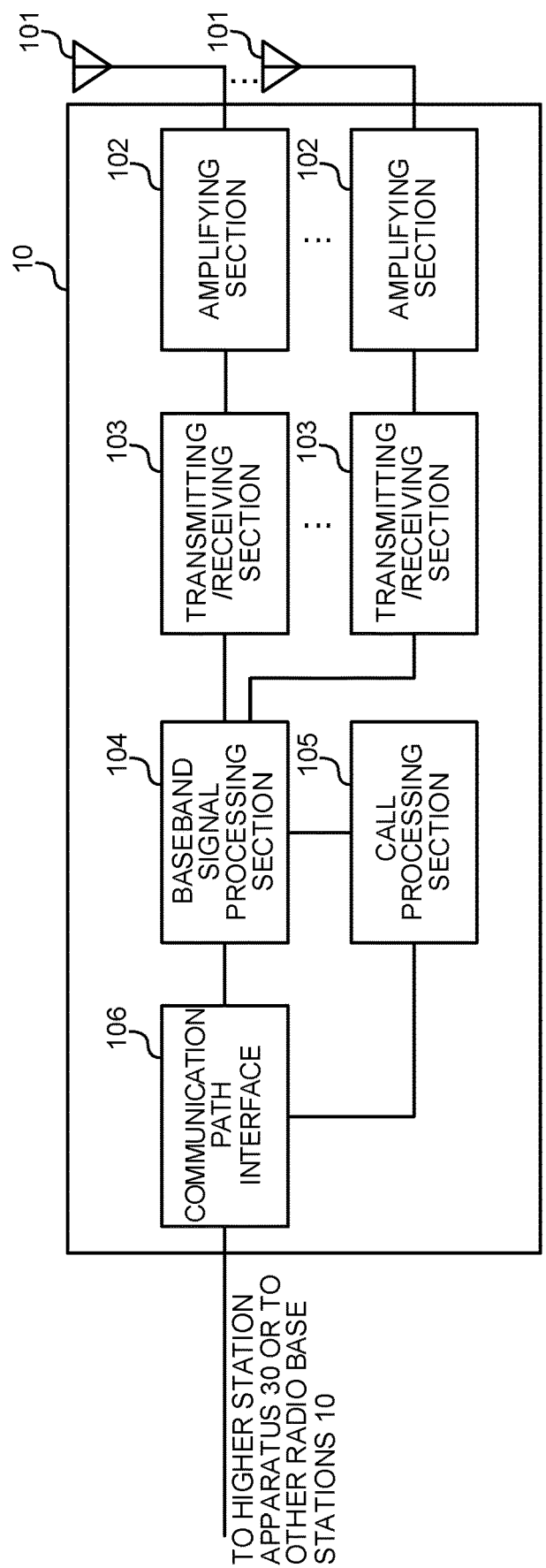
FIG. 16 is a diagram to show an example of an overall structure of a radio base station according to one embodiment of the present invention.

FIG. 16 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit, to the user terminals 20, information related to subframe duration, information related to TTI duration, information related to time resources for control CHs, information related to the number of symbols of control CHs, information about the power gap between a time period for a low power data CH and time periods for other data CHs, and information related to the power gap between a time period for a low power control CH and time periods for other control CHs, and so on.

Figure 17:
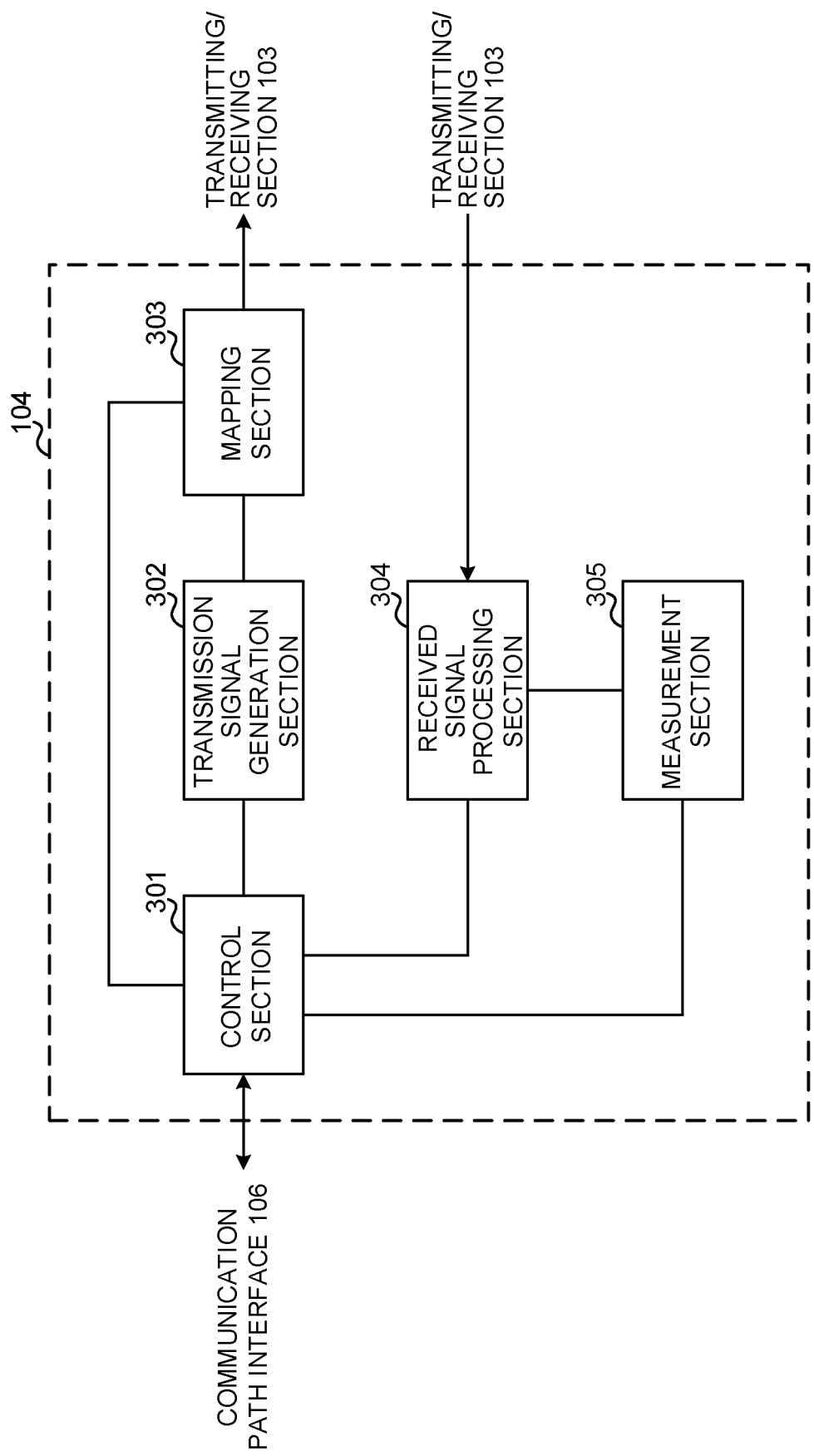
FIG. 17 is a diagram to show an example of a functional structure of a radio base station according to one embodiment of the present invention.

FIG. 17 is a diagram to show an example of a functional structure of a radio base station according to the present embodiment. Note that, although this example will primarily show functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 exerts control so that downlink control information (for example, DCI) for commanding scheduling (transmission and/or receipt of data (TB) in TTI units) to a user terminal 20 is allocated to a downlink control channel in units of subframes (per subframe) and transmitted.

The control section 301 may configure (report) at least one of the subframe duration and the TTI duration to the user terminal 20, and allow the user terminal 20 to control transmission and/or receipt on the assumption that at least one of these is variable, or allow the user terminal 20 to control transmission and/or receipt assuming that neither changes (both are fixed).

For example, the control section 301 may exert control so that transmission of a downlink control channel and/or monitoring of an uplink control channel are skipped while data is being transmitted and/or received. That is, when the control section 301 transmits downlink control information to the user terminal 20 to command transmission and/or receipt of data across multiple subframes, the control section 301 may exert control so that transmission of at least part of the downlink control channels and/or monitoring of uplink control channels included in these subframes are skipped.

Also, the control section 301 may exert control so that data that is transmitted in a time period (for example, one or more symbols from the end of a subframe) of an uplink control channel where monitoring is skipped and/or data that is transmitted in one or more symbols from the end of a TTI (for example, a data channel in one TTI) are transmitted with lower transmission power than data received in other time periods.

Also, the control section 301 may exert control so that receiving processes are performed (and/or the user terminal 20 is allowed to perform low-power transmission), on the assumption that data that is received in a time period (for example, one or more symbols from the beginning of a subframe) of a downlink control channel where transmission is skipped and/or data that is received in one or more symbols from the beginning of a TTI (for example, a data channel in one TTI) are transmitted with lower transmission power than data transmitted in other time periods.

Also, when a downlink control channel is comprised of two or more symbols, the control section 301 may exert control so that at least part of the symbols of the downlink control channel is transmitted with lower power than the other symbols of the downlink control channel In addition, when an uplink control channel is comprised of two or more symbols, the control section 301 may exert control so that receiving processes are performed on the assumption that at least part of the symbols of the uplink control channel is transmitted with lower power than the other symbols of the uplink control channel.

The control section 301 may exert control so that, in a time period for a data channel that is transmitted with low power (for example, a time period for a data signal, a reference signal, a control signal, etc.), a signal (for example, a data signal, a reference signal, a control signal, etc.) is transmitted using a modulation scheme of a lower modulation order and/or a smaller number of MIMO layers than in other time periods (for example, time periods of other data channels), or so that receiving processes are performed on the assumption that a signal is transmitted using a modulation scheme of a low modulation order and a small number of MIMO layers.

In a time period of a control channel that is transmitted with low power, the control section 301 may exert control so that a signal (for example, a control signal, a reference signal, etc.) is transmitted using a modulation scheme of a lower modulation order and/or a small number of MIMO layers than in other time periods (for example, time periods of other data channels), or so that receiving processes are performed on the assumption that a signal is transmitted using a modulation scheme of a low modulation order and/or a small number of MIMO layers.

Furthermore, the control section 401 may transmit various kinds of information for updating parameters used for control in order to allow the user terminal 20 to exert control as described in the first to fourth embodiments.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 18:
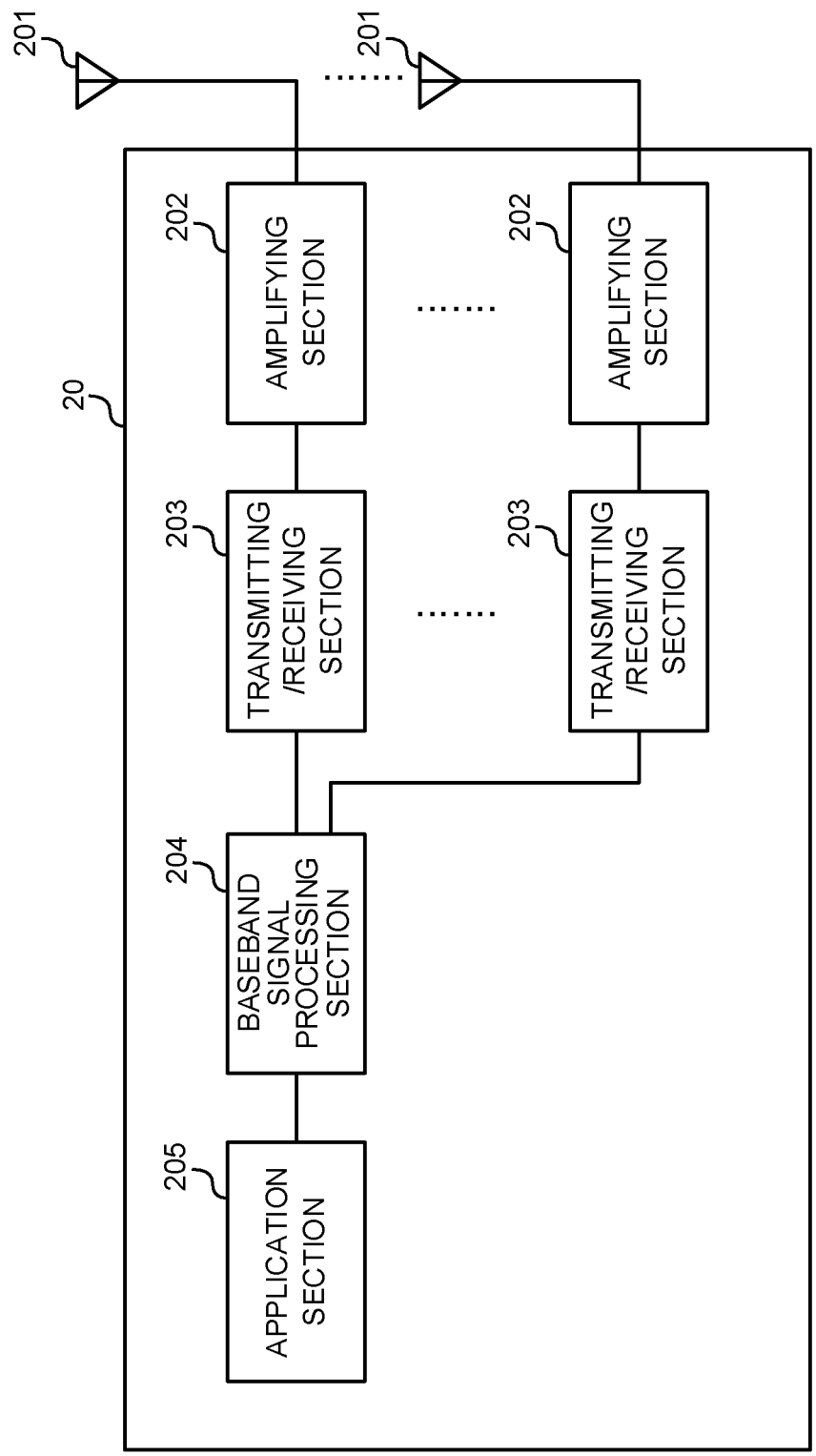
FIG. 18 is a diagram to show an example of an overall structure of a user terminal according to one embodiment of the present invention.

FIG. 18 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may receive, from the radio base station 10, information related to subframe duration, information related to TTI duration, information related to time resources for control CHs, information related to the number of symbols of control CHs, information about the power gap between a time period for a low power data CH and time periods for other data CHs, and information related to the power gap between a time period for a low power control CH and time periods for other control CHs, and so on.

Figure 19:
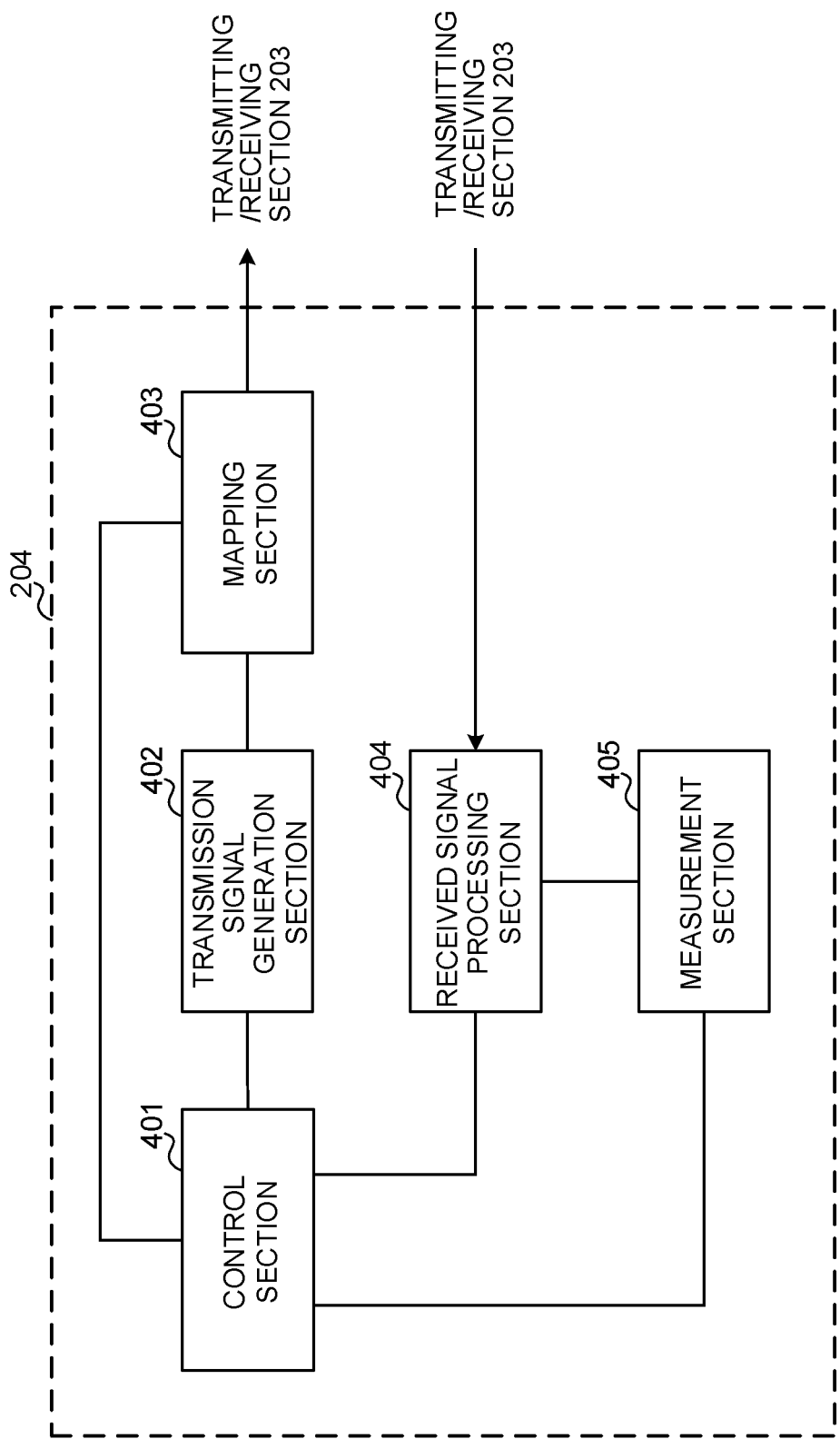
FIG. 19 is a diagram to show an example of a functional structure of a user terminal according to one embodiment of the present invention.

FIG. 19 is a diagram to show an example of a functional structure of a user terminal according to the present embodiment.

Note that, although this example primarily shows functional blocks that pertain to characteristic parts of the present embodiment, user terminal 20 has other functional blocks that are necessary for radio communication as well.

The baseband signal processing section 204 provided in the user terminal 20 has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 exerts control so that a downlink control channel, which is allocated in subframe units (per subframe), is monitored, and downlink control information is received (for example, DCI). Then, the control section 401 controls data (TB) transmission and/or receipt in TTI units based on this downlink control information.

The control section 401 may control transmission and/or receipt on assumption that at least one of the subframe duration and the TTI duration is variable, or control transmission and/or receipt assuming that neither changes (both are fixed).

For example, the control section 401 may exert control so that monitoring of a downlink control channel and/or transmission of an uplink control channel are skipped while data is being transmitted and/or received. That is, when downlink control information for commanding transmission and/or receipt of data spanning multiple subframes is received, the control section 401 may exert control so that transmission of at least part of the downlink control channels and/or monitoring of uplink control channels included in these subframes are skipped.

Also, the control section 401 may exert control so that data that is received in a time period (for example, one or more symbols from the end of a subframe) of an uplink control channel where transmission is skipped and/or data that is transmitted in one or more symbols from the end of a TTI (for example, a data channel in one TTI) are transmitted with lower transmission power than data received in other time periods.

Furthermore, the control section 401 may exert control so that data that is transmitted in a time period (for example, one or more symbols from the beginning of a subframe) of a downlink control channel where monitoring is skipped and/or data that is transmitted in one or more symbols from the beginning of a TTI (for example, a data channel in one TTI) are transmitted with lower power than data transmitted in other time periods.

Also, when a downlink control channel is comprised of two or more symbols, the control section 401 may exert control so that receiving processes are performed on the assumption that at least part of the symbols of the downlink control channel is transmitted with lower power than the other symbols of the downlink control channel.

In addition, when an uplink control channel is comprised of two or more symbols, the control section 401 may exert control so that receiving processes are performed on the assumption that at least part of the symbols of the uplink control channel is transmitted with lower power than the other symbols of the uplink control channel.

The control section 401 may exert control so that, in a time period for a data channel that is transmitted with low power (for example, a time period for a data signal, a reference signal, a control signal, etc.), a signal (for example, a data signal, a reference signal, a control signal, etc.) is transmitted using a modulation scheme of a lower modulation order and/or a smaller number of MIMO layers than in other time periods (for example, time periods of other data channels), or so that receiving processes are performed on the assumption that a signal is transmitted using a modulation scheme of a low modulation order and a small number of MIMO layers.

In a time period of a control channel that is transmitted with low power, the control section 401 may exert control so that a signal (for example, a control signal, a reference signal, etc.) is transmitted using a modulation scheme of a lower modulation order and/or a small number of MIMO layers than in other time periods (for example, time periods of other data channels), or so that receiving processes are performed on the assumption that a signal is transmitted using a modulation scheme of a low modulation order and/or a small number of MIMO layers.

Furthermore, when various kinds of information reported from the radio base station 10 are acquired via the received signal processing section 404, the control section 401 may update the parameters to use in control based on these pieces of information.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 20:
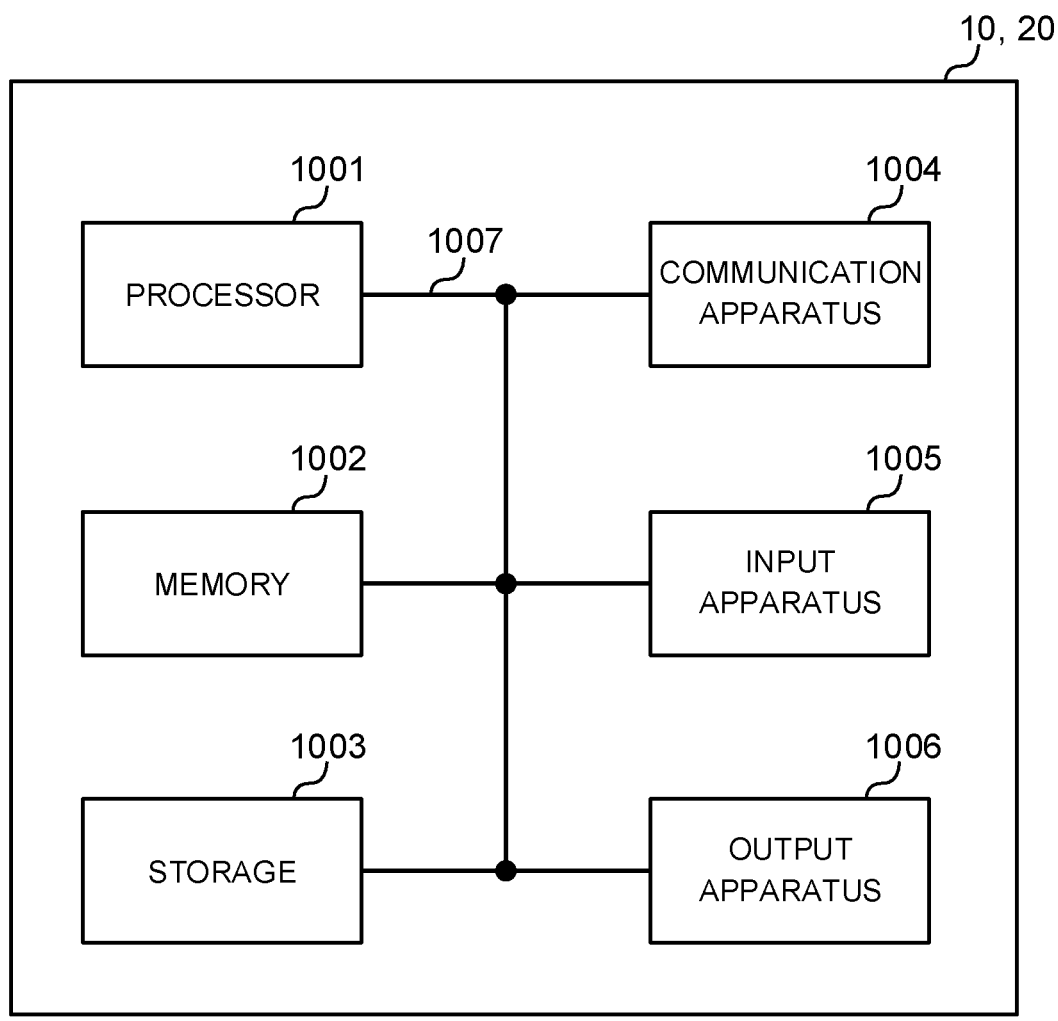
FIG. 20 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 20 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be removed. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-092682, filed on May 2, 2016, including the specification, drawings and abstract, is incorporated herein by reference in its entirety.

The invention claimed is:

1. A terminal, comprising:
a receiver that monitors a downlink control channel which is allocated in units of subframes, and receives downlink control information; and
a processor that controls at least one of data transmission and data reception in units of transmission time intervals (TTIs), based on the downlink control information,
wherein the processor controls at least one of transmission and reception, assuming that at least one of a subframe duration and a TTI duration is variable, and
wherein the processor controls to perform a receiving process assuming that at least one of:
data that is received in a time period of an uplink control channel where transmission is skipped is transmitted with lower transmission power than data that is received in other time periods, and
data that is received in one or more symbols from an end of a TTI is transmitted with lower transmission power than data that is received in other time periods.

2. The terminal according to claim 1, wherein the processor controls to at least one of:
skip monitoring of the downlink control channel during the at least one of data transmission and data reception, and
skip transmission of an uplink control channel during the at least one of data transmission and data reception.

3. The terminal according to claim 1, wherein the processor controls to transmit at least one of:
data that is transmitted in a time period of a downlink control channel where monitoring is skipped with lower transmission power than data that is transmitted in other time periods, and
data that is transmitted in one or more symbols from a beginning of a TTI with lower transmission power than data that is transmitted in other time periods.

4. The terminal according to claim 1, wherein, when the downlink control channel is comprised of two or more symbols, the processor controls to perform a receiving process assuming that at least one of the symbols of the downlink control channel is transmitted with lower power than another symbol of the downlink control channel.

5. The terminal according to claim 1, wherein, when the uplink control channel is comprised of two or more symbols, the processor controls to transmit at least one of symbols of the uplink control channel with lower power than another symbol of the uplink control channel.

6. A radio communication method comprising:
monitoring a downlink control channel which is allocated in units of subframes and receiving downlink control information; and
controlling at least one of data transmission and data reception in units of transmission time intervals (TTIs), based on the downlink control information,
wherein at least one of transmission and reception is controlled assuming that at least one of a subframe duration and a TTI duration is variable, and
wherein the method further includes controlling to perform a receiving process assuming that at least one of:
data that is received in a time period of an uplink control channel where transmission is skipped is transmitted with lower transmission power than data that is received in other time periods, and
data that is received in one or more symbols from an end of a TTI is transmitted with lower transmission power than data that is received in other time periods.

7. The user terminal according to claim 2, wherein the processor controls to transmit at least one of:
data that is transmitted in a time period of a downlink control channel where monitoring is skipped with lower transmission power than data that is transmitted in other time periods, and
data that is transmitted in one or more symbols from a beginning of a TTI with lower transmission power than data that is transmitted in other time periods.

8. The terminal according to claim 2, wherein, when the downlink control channel is comprised of two or more symbols, the processor controls to perform a receiving process assuming that at least one of the symbols of the downlink control channel is transmitted with lower power than another symbol of the downlink control channel.

9. The user terminal according to claim 3, wherein, when the downlink control channel is comprised of two or more symbols, the processor controls to perform a receiving process assuming that at least one of the symbols of the downlink control channel is transmitted with lower power than another symbol of the downlink control channel.

10. The terminal according to claim 2, wherein, when the uplink control channel is comprised of two or more symbols, the processor controls to transmit at least one of symbols of the uplink control channel with lower power than another symbol of the uplink control channel.

11. The terminal according to claim 3, wherein, when the uplink control channel is comprised of two or more symbols, the processor controls to transmit at least one of symbols of the uplink control channel with lower power than another symbol of the uplink control channel.

12. The terminal according to claim 4, wherein, when the uplink control channel is comprised of two or more symbols, the processor controls to transmit at least one of symbols of the uplink control channel with lower power than another symbol of the uplink control channel.

* * * * *